(12) United States Patent
Sugiura et al.

(10) Patent No.: US 7,966,303 B2
(45) Date of Patent: Jun. 21, 2011

(54) DATA PROCESSING APPARATUS, DATA PROCESSING METHOD, AND COMPUTER-READABLE RECORDING MEDIUM

(75) Inventors: Yuuko Sugiura, Tokyo (JP); Kohei Noguchi, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 293 days.

(21) Appl. No.: 11/699,490

(22) Filed: Jan. 30, 2007

(65) Prior Publication Data
US 2007/0192335 A1    Aug. 16, 2007

(30) Foreign Application Priority Data

Jan. 31, 2006  (JP) ................. 2006-022111

(51) Int. Cl.
G06F 7/00    (2006.01)
G06F 17/00    (2006.01)
(52) U.S. Cl. ....................... 707/705; 707/795
(58) Field of Classification Search .......... 707/1, 2, 707/204, 999.001, 705, 795, 803
See application file for complete search history.

(56) References Cited

U.S. PATENT DOCUMENTS

| 6,324,302 | B1 | 11/2001 | Sugiura | |
|---|---|---|---|---|
| 2004/0089727 | A1* | 5/2004 | Baharav et al. | 235/494 |
| 2005/0195446 | A1* | 9/2005 | Kasatani | 358/402 |
| 2006/0126101 | A1* | 6/2006 | Shutt et al. | 358/1.15 |
| 2006/0285168 | A1* | 12/2006 | Horino et al. | 358/3.28 |
| 2008/0134088 | A1* | 6/2008 | Tse et al. | 715/810 |
| 2008/0279348 | A1* | 11/2008 | Carro | 379/88.04 |

FOREIGN PATENT DOCUMENTS

| JP | 2000-270179 | | 9/2000 |
|---|---|---|---|
| JP | 2002-215768 | A | 8/2002 |
| JP | 2002-304201 | A | 10/2002 |
| JP | 2005-039366 | A | 2/2005 |

* cited by examiner

Primary Examiner — Angela M Lie
(74) Attorney, Agent, or Firm — Dickstein Shapiro LLP

(57) ABSTRACT

A data processing apparatus includes a setting part for setting a combination including location data indicating the location of a data source located in a target data item and a designated process corresponding to the location data, an acquiring part for acquiring the target data item and a data processing part for obtaining data from the data source located at the location indicated by the location data by referring to the combination set by the setting part and performing the designated process corresponding to the location data on the target data item in accordance with the combination by using the data obtained from the data source.

18 Claims, 18 Drawing Sheets

| ID | DATA SOURCE LOCATION | DATA SOURCE TYPE | DESIGNATED PROCESS | VALID/INVALID | DATA CONTENT OF DATA SOURCE |
|---|---|---|---|---|---|
| 1 | (Xs1,Ys1,Xe1,Ye1) | BARCODE | PROCESS A | VALID | |
| 2 | (Xs1,Ys1,Xe1,Ye1) | BARCODE | PROCESS B | INVALID | |
| 3 | (Xs2,Ys2,Xe2,Ye2) | OCR | PROCESS C | VALID | |
| 4 | (Xs3,Ys3,Xe3,Ye3) | QR CODE | PROCESS D | INVALID | |

FIG.3

| ID | DATA SOURCE LOCATION | DATA SOURCE TYPE | DESIGNATED PROCESS | VALID/INVALID | DATA CONTENT OF DATA SOURCE |
|---|---|---|---|---|---|
| 1 | (Xs1,Ys1,Xe1,Ye1) | BARCODE | PROCESS A | VALID | |
| 2 | (Xs1,Ys1,Xe1,Ye1) | BARCODE | PROCESS B | INVALID | |
| 3 | (Xs2,Ys2,Xe2,Ye2) | OCR | PROCESS C | VALID | |
| 4 | (Xs3,Ys3,Xe3,Ye3) | QR CODE | PROCESS D | INVALID | |

FIG.6

| ID | BARCODE LOCATION | DESIGNATED PROCESS | VALID/INVALID | BARCODE RECOGNITION RESULT |
|---|---|---|---|---|
| 1 | (100,50,200,100) | FAX TRANSMISSION | INVALID | |
| 2 | (100,50,200,100) | FAX TRANSMISSION + TRANSFER | VALID | |
| 3 | (100,100,200,250) | FOLDER TRANSFER | VALID | |

| IMAGE SIZE | A4 VERTICAL |
|---|---|
| IMAGE DIRECTION | READOUT LINE DIRECTION IS VERTICAL |

FIG.10

ERROR!

YOU HAVE DESIGNATED
AN AREA BEYOND IMAGE

PLEASE RE-ENTER VALUE

OK

DATA PROCESSING APPARATUS, DATA PROCESSING METHOD, AND COMPUTER-READABLE RECORDING MEDIUM

BACKGROUND OF THE INVENTION

1. Field of the Invention

The present invention relates to an apparatus, a method, and a computer-readable recording medium for performing a process on acquired data by using data obtained from a predetermined data source of the acquired data.

2. Description of the Related Art

Conventionally, with a conventional facsimile communication apparatus (facsimile apparatus), a barcode may be used to input a facsimile destination number when performing fax transmission. For example, a barcode indicative of a facsimile destination number may be formed on a coversheet of a document or attached as a sticker on the coversheet and read out by a barcode reader.

By using this facsimile apparatus, inadvertent input of the facsimile destination number can be effectively prevented (See, for example, Japanese Laid-Open Patent Application No. 2000-270179).

However, codes such as barcodes formed on documents are not only for the purpose of facsimile transmission. For example, a barcode for indicating information such as the category of the document or the serial number of the document may be formed on the coversheet of the document so that the information of the barcode can be used to facilitate organizing of documents.

Since the barcode for such purpose has information different from that included in the barcode for indicating facsimile destination, the barcodes are used separately. In a case of storing documents to be transmitted to a prescribed destination, the barcodes used for indicating facsimile destination and the barcodes used for document organization have to be formed separately.

Therefore, as one example, a coversheet used for facsimile transmission and another coversheet used for document organizing may be prepared separately so that a coversheet suited for each purpose can be used. However, preparing separate coversheets with a different barcode increases consumption of paper and is burdensome from the aspects of preparation and management.

As another example, plural barcodes corresponding to each operation (facsimile transmission and document organization) may be formed on a single coversheet. However, in a case of using a flat head type scanner for detecting a barcode by scanning an image formed on each document, the scanner may determine that the plural barcodes on the coversheet are all meant for the same purpose even though each barcode of the plural barcodes formed on the single coversheet serves a different purpose. Accordingly, the information included in the barcodes may cause undesired operations to be performed.

For example, in transmitting the coversheet with plural barcodes, the scanner may inadvertently recognize a barcode for document organization, obtain information included in the barcode by decoding the barcode, and interpret that the obtained information indicates the number of a facsimile destination.

As long as a desired operation is performed based on data of a specific data source included in a target data item subjected to data processing, similar problems may occur in a case of performing an operation other than facsimile transmission and document organization, in a case where a data resource other than a barcode is formed on a document, or in a case where a target data item is data other than image data.

SUMMARY OF THE INVENTION

The present invention may provide a data processing apparatus, a data processing method, and a computer-readable recording medium that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data processing apparatus, a data processing method, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data processing apparatus including: a setting part for setting a combination including location data indicating the location of a data source located in a target data item and a designated process corresponding to the location data; an acquiring part for acquiring the target data item; and a data processing part for obtaining data from the data source located at the location indicated by the location data by referring to the combination set by the setting part and performing the designated process corresponding to the location data on the target data item in accordance with the combination by using the data obtained from the data source.

Furthermore, another embodiment of the present invention provides a data processing method including the steps of: a) setting a combination including location data indicating the location of a data source located in a target data item and a designated process corresponding to the location data; b) acquiring the target data item; c) obtaining data from the data source located at the location indicated by the location data by referring to the combination set in step a); and d) performing the designated process corresponding to the location data on the target data item in accordance with the combination by using the data obtained from the data source.

Furthermore, yet another embodiment of the present invention provides a computer-readable recording medium on which a program for causing a computer to execute a data processing method is recorded, the data processing method comprising the steps of: a) setting a combination including location data indicating the location of a data source located in a target data item and a designated process corresponding to the location data; b) acquiring the target data item; c) obtaining data from the data source located at the location indicated by the location data by referring to the combination set in step a); and d) performing the designated process corresponding to the location data on the target data item in accordance with the combination by using the data obtained from the data source.

Other objects and further features of the present invention will be apparent from the following detailed description when read in conjunction with the accompanying drawings.

BRIEF DESCRIPTION OF THE DRAWINGS

FIG. 3 shows an example of combinations of data (including location data, process data, and data related to the location data and the process data) stored in a process storing part of the data processing apparatus shown in FIG. 1;

FIG. 6 shows an example of combinations of data (including location data, process data, and data related to the location data and the process data) stored in a process storing part of the MFP shown in FIG. 4;

FIG. 10 shows a display example of an error screen of the MFP shown in FIG. 4;

DESCRIPTION OF THE PREFERRED EMBODIMENTS

In the following, embodiments of the present invention are described with reference to the accompanying drawings.

Figure 1:
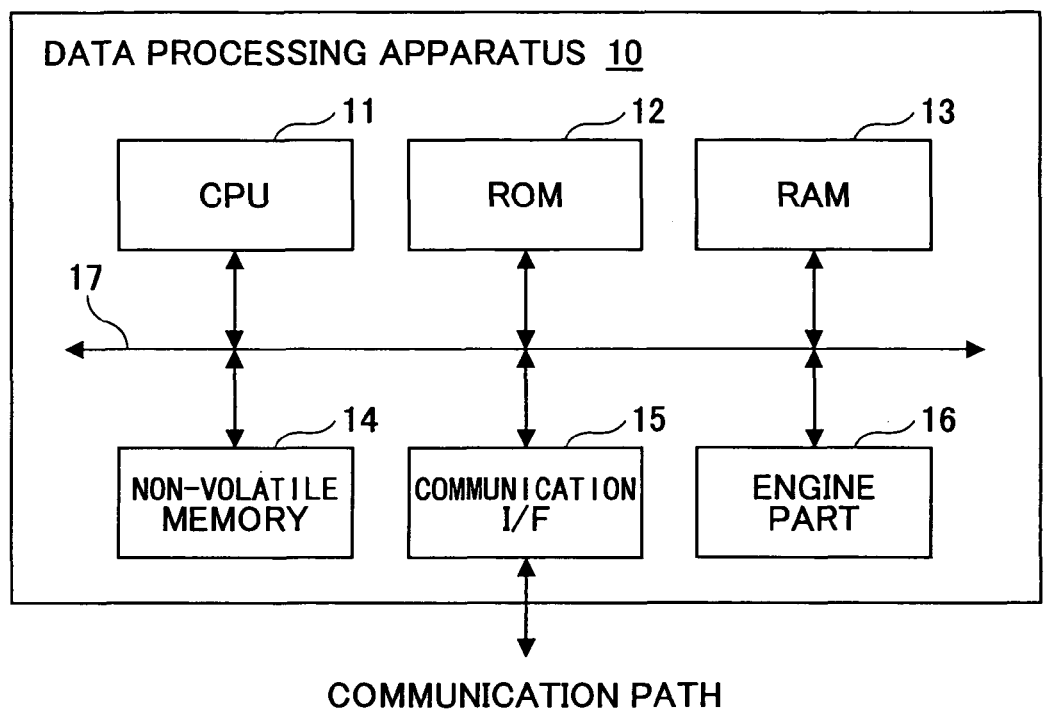
FIG. 1 is a block diagram showing a hardware configuration of a data processing apparatus according to an embodiment of the present invention.
Figure 2:
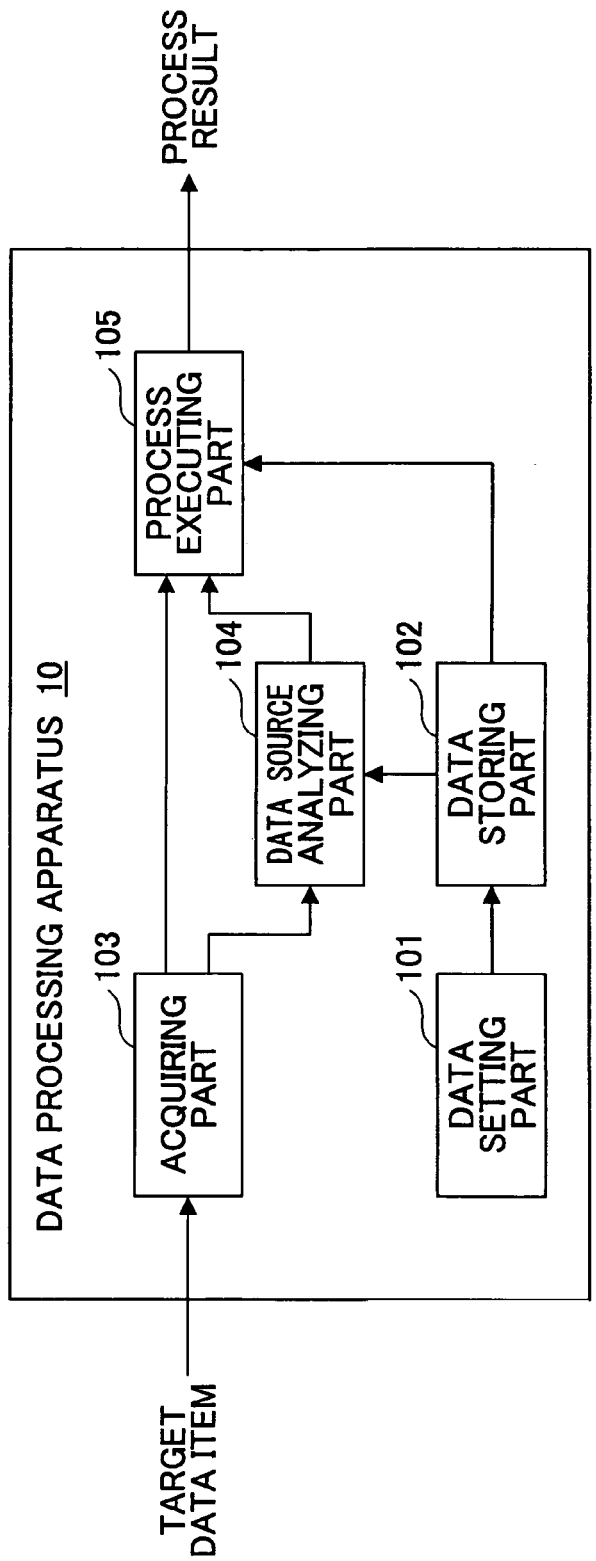
FIG. 2 is a block diagram showing a functional configuration of the data processing apparatus shown in FIG. 1.

First Embodiment, FIGS. 1-3

First, a data processing apparatus according to a first embodiment of the present invention is described. FIG. 1 is a schematic diagram showing an exemplary hardware configuration of the data processing apparatus.

As shown in FIG. 1, the data processing apparatus 10 includes a CPU 11, a ROM 12, a RAM 13, a non-volatile memory 14, a communication interface (I/F) 15, and an engine part 16 which are connected together by a system bus 17.

The CPU 11 is a control part for conducting overall control of the entire data processing apparatus 10. For example, the CPU 11 also functions, for example, as a setting part and a data processing part by executing a program(s) recorded in the ROM 12, the non-volatile memory 14.

The ROM 12 is a non-volatile storage part for storing, for example, programs executed by the CPU 11 and various data such as fixed parameters. The ROM 12 may be configured as a rewritable storing part able to update the programs and various data.

The RAM 13 is a storage part for temporarily storing data and serving as a work memory of the CPU 11.

The non-volatile memory 14 is a rewritable non-volatile storage part (e.g. flash memory, HDD (hard disk drive)) for storing programs executed by the CPU 11 and parameters that are to be stored even after power of the data processing apparatus is turned off. The non-volatile memory 14 may also store data to be processed by the data processing function of the CPU 11 or the data processed by the data processing function of the CPU 11.

The communication I/F 15 is an interface for connecting the data processing apparatus 10 with a communication path such as a network. For example, the communication I/F 15 may be a network interface for communicating by using Ethernet (Registered Trademark). As another example, the communication I/F 15 may be an interface for performing facsimile communication via a public line (e.g. public switched network). In a case of communicating with other apparatuses via the communication path, the communication I/F 15 and the CPU 11 function as a communication part. It is to be noted that the communication I/F 15 may use, for example, a standard or a communication protocol suitable for the communication path. Furthermore, plural communication I/Fs 15 corresponding to various standards may be provided.

The engine part 16 is a part for enabling the data processing apparatus 10 to perform physical input and output with the outside other than performing data communications. For example, in a case where the data processing apparatus 10 is a digital multi-function machine, the engine part 16 may be a print engine (e.g. electrophotographic type print engine) for forming images on paper, a scanner engine for reading images on paper as image data, or a control panel for being operated by a user or displaying various messages and settings. The CPU 11 controls such operations of the engine part 16 for enabling the data processing apparatus 10 to perform input/output operation.

In a case of using the data processing apparatus 10 in a standalone mode, the communication I/F 15 does not need to be used. In a case of not performing input/output other than data communication, the engine part 16 does not need to be used.

Next, a functional configuration of the data processing apparatus 10 according to an embodiment of the present invention is described. FIG. 2 is a block diagram showing a functional configuration of the data processing apparatus 10.

As shown in FIG. 2, the data processing apparatus 10 includes a data setting part (setting part) 101, a data storing part 102, a target data obtaining part 103, a data source analyzing part 104, and a process executing part 105. The functions of the functional parts included in the data processing apparatus 10 are executed by having the CPU 11 execute predetermined programs and control operations of other hardware.

The data setting part (setting part) 101 is for setting location data in correspondence with process data in accordance with the instructions from the user. The location data indicate the location of a predetermined data source(s) to be identified when acquiring a target data item. The process data indicates what process is to be performed on the target data item by using the data of the data source.

The data storing part 102 is for storing data set by the data setting part 101. The actual storing of the data may be performed, for example, by the non-volatile memory 14.

In this example, the data set by the data setting part 101 is set in the data storing part 102 as a format (table) shown in FIG. 3. That is, location data is set to the item "data source location", and process data is set to the item "designated process". Furthermore, the type of data of the data source is set to the item "data source type". Whether to perform (execute) the process using the data of the data source is set to the item "valid/invalid".

In a case where the target data item is an image data item, a predetermined area within the image of the image data item is set to the "data source location". The predetermined area is set as a rectangular area defined by parameters including a start position in the X axis direction (Xs), an end position in the X axis direction (Xe), a start position in the Y axis direction (Ys), and an end position in the Y axis direction (Ye).

It is to be noted that plural processes may be set corresponding to the same position (for example, ID=1 and ID=2 shown in FIG. 3). In this case, plural processes are performed by using the data of the same data source.

For example, various types of codes (e.g. bar code, QR code) or OCR (Optical Character Recognition) can be set to the item "data source type". The type of code is for indicating that a decoding process matching to the format of the image data item indicated in the data source location is to be performed on the image data item for analyzing the data of the data source. OCR is for indicating that a character recognition process is to be performed on the image data item for obtaining data of the data source.

The "designated process" is for enabling the data processing apparatus 10 to alternatively select and execute the process to be performed on the target data item by using the data of the data source. The designated process includes, for example, facsimile transmission, electronic mail transmission, data storage, printing, image processing, and combinations of these processes.

The item "valid/invalid" is for specifying whether to perform a process(es) indicated in the item "designated process" or whether to perform the process of analyzing or obtaining the data of the data source before performing the "designated process". Although various processes are set in the item "designated process", the processes do not necessarily have to be performed every time. Therefore, the item "valid/invalid" is provided.

It is to be noted that the item "data content of data source" is an item to which data obtained by analyzing the data source of the target data item is temporarily registered. This item "data content of data source" may therefore be blank at the time of setting the item "data source location" or the item "designated process". Furthermore, the "data content of data source" does not necessarily have to be set in series with the above-described items.

Although the example of FIG. 3 shows a format (table) including four combinations, the upper limit of the number of combinations is not limited to four. The number of combinations that can be set may be variable. Furthermore, a variety of formats including the plural combinations of items may be stored in a configuration file (config. file) for enabling one of the formats to be chosen when inputting the image data of the target data item.

Although this example describes a case where the target data item is an image data item, other types of data may be used as the target data item. For example, the target data item may be a text data item, an audio data item, a moving image data item, or a data item created by using a predetermined application (e.g. word processing application, a spreadsheet application, a drawing application, a database application). The data source location may be defined by using other types of forms and expressions. For example, the data source location may be defined by, the distance from the edge of an image, the distance from the edge of a document, number of dots, number of bytes, number of characters, number of lines, number of data entries, or reproduction time.

Returning to the description of FIG. 2, the target data obtaining part 103 is for acquiring the target data item subject to the process designated by the item "designated process". The acquirement of the target data item may be, for example, reading the target data item with a scanner, receiving the target data item via a public line or a network, or reading out the target data item from a data storing part.

In a case where the target data obtaining part 103 acquires the target data item, the data source analyzing part 104 is for analyzing the target data item in accordance with the data corresponding to the items "data source location" and "data source type" stored in the data storing part 102, extracting data to be used for executing the process designated in the item "designated process" from the acquired target data item, and delivering the extracted data to the process executing part 105.

The process executing part 105 executes the process designated in the item "designated process" in the data storing part 102 with respect to the target data item in accordance with the data delivered from the data source analyzing part 104.

In this example, the data source analyzing part 104 and the process executing part 105 serve as a data processing part. The data processing part perform data acquisition and process execution in correspondence with the combination(s) including these items indicated as "valid" in the table shown in FIG. 3. Accordingly, if plural combinations of these items are "valid", plural processes are executed with respect to the same target data item. For example, the order of executing the processes may be an order based on the order of ID numbers or an order complying to a prioritized process(es).

By realizing the functions of FIG. 2 with the hardware configuration shown in FIG. 1 according to the above-described data processing apparatus 10, a desired process can be reliably executed based on data of an appropriate data source.

That is, even in a case where plural data sources are indicated with the same data type (data format) in a target data item, the data processing apparatus 10 can automatically identify the appropriate data source from the plural data sources in accordance with the location data and use the data of the appropriate data source for executing a desired process. This prevents data of an unanticipated data source from being erroneously used. Thus, a process other than a desired process can be prevented from being executed.

Once the designated process data are input to the data processing apparatus 10, the data processing apparatus 10 can execute each of the processes since the data processing apparatus 10 can be set with plural groups including combinations of data source location data and designated process data. Thereby, the data processing apparatus 10 can provide high operation performance.

Second Embodiment, FIGS. 4-18

Figure 4:
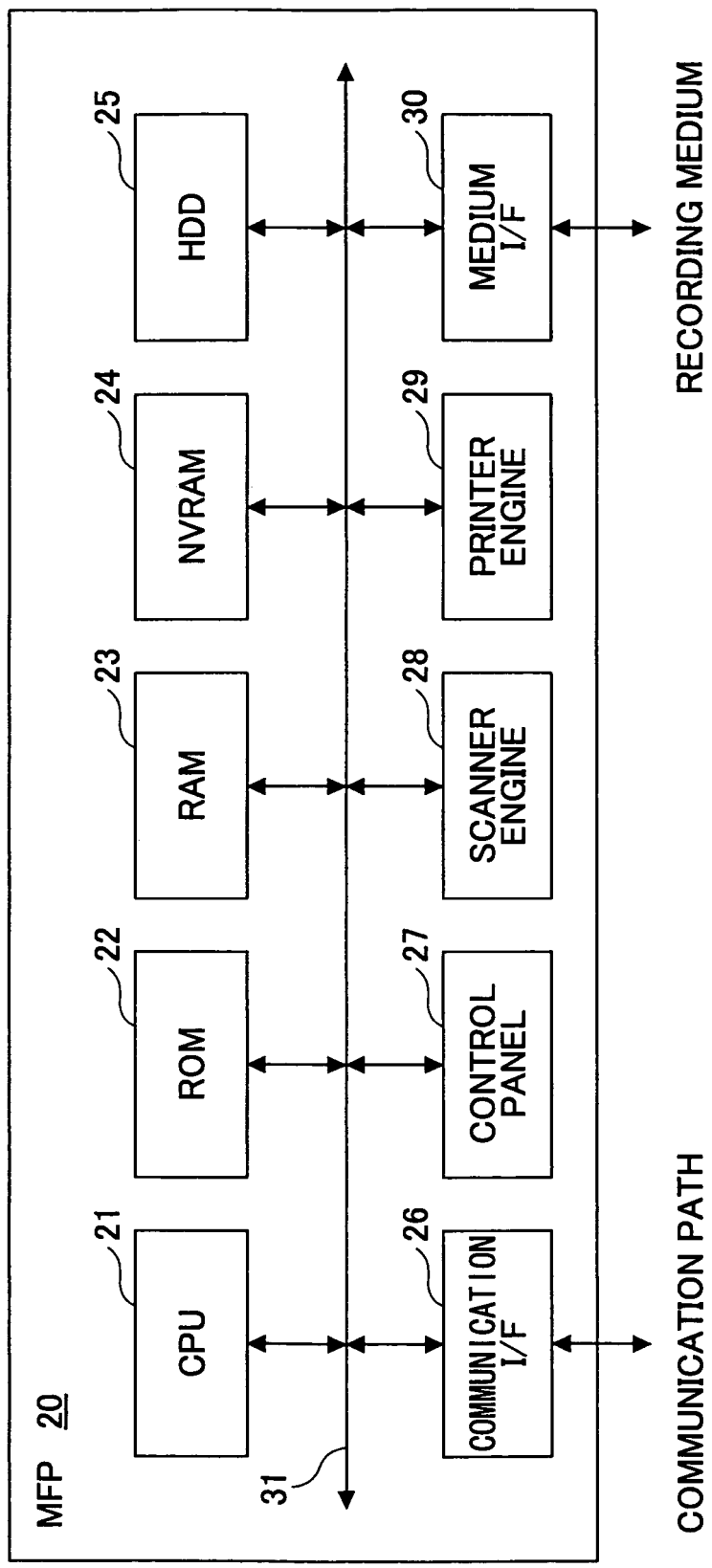
FIG. 4 is a block diagram showing a hardware configuration of a data processing apparatus (MFP) according to another embodiment of the present invention.

Next, a data processing apparatus according to a second embodiment of the present invention is described. FIG. 4 is a block diagram showing a hardware configuration of a data processing apparatus (in this embodiment, a multifunction printer (MFP)) according to the second embodiment of the present invention.

As shown in FIG. 4, the MFP 20 includes a CPU 21, a ROM 22, a RAM 23, an NVRAM (non-volatile RAM) 24, a HDD 25, a communication I/F 26, a control panel 27, a scanner engine 28, a printer engine 29, and a medium interface I/F 30 which are connected by a system bus 31.

Since the CPU 21, the ROM 22, the RAM 23, the communication I/F 26 have the same functions as those of the above-described data processing apparatus 10 according to the first embodiment of the present invention, further description thereof is omitted. Furthermore, since the RAM (non-volatile RAM) 24 and the HDD 25 have the same function as the non-volatile memory 14 of the above-described data processing apparatus 10 according to the first embodiment of the present invention, further description thereof is omitted.

The control panel 27 includes a display part (e.g. a liquid crystal display (LCD), a light emitting diode (LED) and a control part (e.g. a touch panel having various keys and buttons provided on a LCD). The display part is for displaying, for example, a GUI (Graphical User Interface) showing operation status, settings, messages, and controls of the MFP 20. The control part is for receiving controls and instructions of the user to the MFP 20.

The scanner engine 28 is an image reading part for reading out an image from a document and obtaining image data of the image. For example, the obtained image data may be stored in the RAM 23 or the HDD 25, transmitted to an outside apparatus via the communication I/F 26, or delivered to the printer engine 29 to have the read out image printed out.

The printer engine 29 is an image forming part for forming an image(s) on a sheet of paper according to bit-mapped image data. The method for forming the image may be, for example, an electrophotographic method or other known image forming methods.

The medium I/F 30 is an interface for mounting a detachably attachable non-volatile recording medium (e.g. SD (Secure Digital) card) and writing and reading and data to and from the recording medium.

Figure 5:
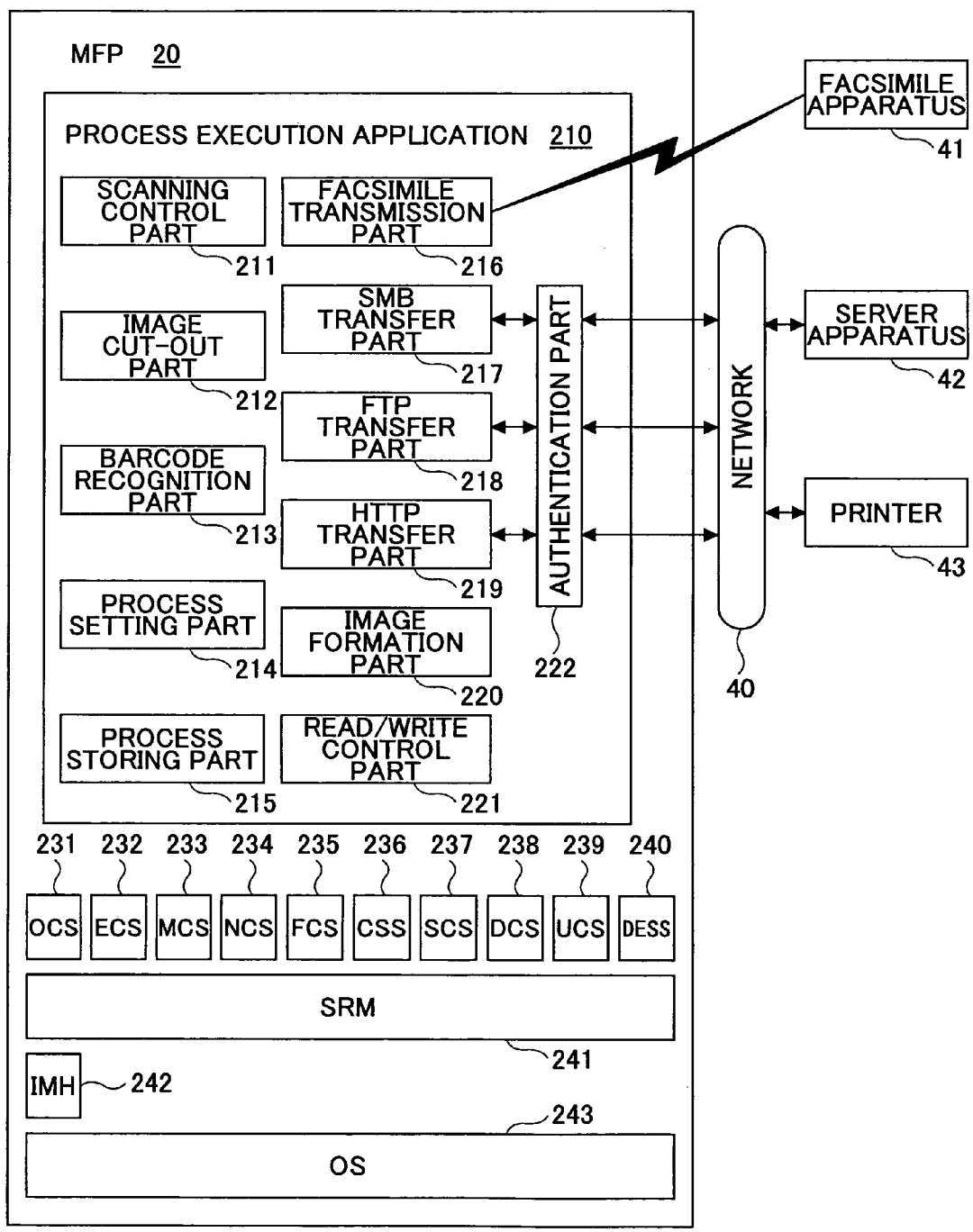
FIG. 5 is a block diagram showing a functional configuration of the MFP shown in FIG. 4.

Next, a functional configuration of the MFP 20 according to an embodiment of the present invention is described. FIG. 5 is a block diagram showing a functional configuration of the MFP 20.

With reference to FIG. 5, it is to be noted that, although the functions of the functional parts included in the MFP 20 are executed by having the CPU 11 execute predetermined programs and control operations of other hardware, some of the blocks are illustrated with names of software for executing the functions. Furthermore, for the sake of convenience, the processes and operations performed by having the CPU 11 execute software are described as being processes and operations performed by the software.

The MFP 20 includes a process execution application 210 serving as software in the uppermost application module layer. By executing the process execution application 210, data are extracted from a predetermined data source of a target data item and a predetermined process(es) is performed on the target data item in accordance with the extracted data. The process execution application 210 may be a DSDK (Device Software Development Kit) application configured to use J2ME (Java 2 Micro Edition, Java (Registered Trademark) used for embedded devices) and operate in a DSDK environment.

The process execution application 210 is a program providing the functions of a scanning control part 211, an image cut-out part 212, a barcode recognition part 213, a process setting part 214, a process storing part 215, a facsimile transmission part 216, an SMB (Server Message Block) transfer part 217, an FTP (File Transfer Protocol) transfer part 218, an HTTP (HyperText Transfer Protocol) transfer part 219, an image formation part 220, a read/write control part (storing part) 221, and an authentication part 222.

The scanning control part 211 has a function of controlling the document image reading operation of the scanner engine 28. This reading operation may be used as a method of inputting image data of the target data item to the process execution application 210.

The image cut-out part 212 has a function of cutting out an image data item of a predetermined area (area determined to be the location of the data source including the data to be used for a designated process) from the target data item (in this example, image data).

The barcode recognition part 213 has a function of performing an image processing operation for recognizing a barcode in the image data item cut out by the image cut-out part 212 and a function of obtaining data indicated in the recognized barcode.

Since the data source in this example is a barcode, the barcode recognition part 213 is provided. However, in a case where data of another type is used as the data source, a recognition part corresponding to the other type of data may be alternatively provided.

Similar to the data setting part 101 described in the first embodiment of the present invention, the process setting part 214 has a function of setting, in accordance with the instructions of the user, the location data indicating the location of the data source to be recognized when acquiring the target data item in correspondence with the process data indicating the process to be executed by using the data of the data source. Furthermore, similar to the data storing part 102 described in the first embodiment of the present invention, the process storing part 215 has a function of storing the location data and its corresponding process data set by the process setting part 214.

The facsimile transfer part 216 has a function of transmitting and receiving image data between an outside facsimile apparatus 41 by using facsimile communication. The facsimile communication may be performed by using a public line or the Internet.

The SMB transfer part 217, the FTP transfer part 218, and the HTTP transfer part 219 has a function of transmitting and receiving data with outside apparatuses (e.g. server 42, printer 43) by using SMB, FTP, HTTP, respectively.

The image formation part 220 has a function of controlling the forming of images on paper with the printer engine 29 based on the read out image data. This operation of forming images on paper may be one of the processes designated to be performed on the image data (target data item).

The read/write control part 221 has a function of controlling the operations of reading and writing image data with respect to, for example, the HDD 25 and the NVRAM 24. The operation of writing image data to the storing parts (e.g. HDD 25, NVRAM 24) may be one of the processes designated to be performed on the image data (target data item). The operation of reading out image data from the storing parts may be used as a method of inputting image data of the target data item to the process execution application 210.

The authentication part 222 has a function of responding to an authentication request from an opponent during data transmission/reception with the SMB transfer part 217, the FTP transfer part 218, or the HTTP transfer part 219. In addition, the authentication part 222 also has a function of authenticating the origin of the opponent in a case where the opponent requests to establish communication with the SMB transfer part 217, the FTP transfer part 218, or the HTTP transfer part 219.

In executing the various functions of the above-described parts, the process execution application 210 controls operation of hardware resources by using corresponding software (e.g. OCS (Operation Control Service) 231, as shown below the process execution application 210 in FIG. 5) in a service module layer below the application module layer.

The software in the service module layer, which operate between hardware resources and the software in the application module layer, include programs enabling the CPU 21 to serve as a service controlling part for acquiring operation requests from plural applications to hardware resources, mediating the operation requests, and controlling execution of the operations based on the operation requests.

The operating system (OS) 243 may be an operating system such as UNIX (Registered Trademark). The operating system 243 uses each of the programs in the service module layer and the application module layer as a process and executes the processes in parallel.

The service module layer includes an operation control service (OCS) 231, an engine control service (ECS) 232, a memory control service (MCS) 233, a network control service (NCS) 234, a fax control service (FCS) 235, a customer support system (CSS) 236, a system control service (SCS) 237, a delivery control service (DCS) 238, a user control service (UCS) 239, a data encryption security service (DESS) 240, a system resource manager (SRM) 241, and an image memory handler (IMH) 242.

Next, the software included in the service module layer is described in further detail.

The OCS 231 is a module for controlling the control panel 27. The ECS 232 is a module for controlling engines such as the scanner engine 28 and the printer engine 29. The MCS 233 is a module for controlling memory. For example, the MCS 233 controls the obtaining/opening with respect to the image memory and controls the use of the HDD 25.

The NCS 234 is a module for mediating between a network and the application programs in the application module layer. The FCS 235 is a module for controlling, for example, communication (transmission/reception), reading, and printing of the facsimile apparatus. The CSS 236 is a module for converting data when transmitting/receiving data via a public line and conducting remote management via a public line.

The SCS 237 is a module for conducting activation management and termination management of application programs according to the content of the commands to the MFP 20 from the user or other outside apparatuses. The DCS 238 is a module for conducting transmission and reception of image files stored (or to be stored) in the HDD 25 or the NVRAM 24 by using, for example, SMB, FTP, HTTP, LDAP (Lightweight Directory Access Protocol), SMTP (Simple Mail Transfer Protocol). The UCS 239 is a module for managing user data (e.g. destination data and address data corresponding to a fax destination number or an image data storage destination folder registered by the user).

The DESS 240 is a module for conducting authentication of each component and outside apparatus and communication encryption by using PKI (Public Key Infrastructure), SSL (Secure Socket Layer). The SRM 241 is a module for conducting system control and resource management. The IMH 242 is a module for managing a memory for temporarily storing image data.

The function of acquiring instructions (e.g. instructions for activating/terminating the process execution application 210, setting process data (process content data), acquiring the target data item) from the control panel 27 is realized by the OCS 231 and the SCS 237. Furthermore, the fax transfer part 216 of the process execution application 210 uses the functions of the FCS 235 and the SCS 237 for performing facsimile communication.

The SMB transfer part 217, the FTP transfer part 218, the HTTP transfer part 219 used the functions of the NCS 234, the SCS 237 and the DCS 238 for performing data communication (transmission/reception). In addition, a separate open-source communication program may also be used. The scanning control part 211 uses the functions of the ECS 232, the MCS 233, and the SCS 237 for scanning a document(s).

In a case of installing a program such as the process execution application 210 to the MFP 20, the origin (original apparatus) sending the program or the recording medium (original recording medium) from which the program is read out may be subject to authentication by the DESS 240 for confirming its authenticity.

Next, the setting process (setting the content of the process to be performed on the target data item and setting the data source used for performing the process) conducted by the process setting part 214 of the MFP 20 is described.

FIG. 6 shows an example of data regarding the processes and data sources stored in the process storing part 215.

As shown in FIG. 6, the data regarding the processes and data sources are substantially stored in the MFP 20 in the same manner as the first embodiment of the present invention (see FIG. 3). However, in the MFP 20, the data type of the data source is barcode only. Therefore, the item "data source type" is not provided.

In the item "barcode location", the area in the image shown by the image data is set as a rectangular area which is defined in accordance with parameters "Xs", "Ys", "Xe", and "Ye" (In the example shown in FIG. 6, actual values are input for indicating the parameters of the barcode location). In FIG. 6, "Xs" indicates the starting point in the X axis direction (sub-scanning direction:paper conveying direction) of the target document (document from which the image data is read), "Ys" indicates the starting point in the Y axis direction (main scanning direction:reading line direction) of the target document, "Xe" indicates the terminating point in the X direction, and "Ye" indicates the terminating point in the Y direction. In a case of inputting image data of the target data item with a method other than scanning a target document with the scanner engine 28, the barcode location may be set by converting the input image data to the expression of dots.

Furthermore, the item "designated process" is for enabling the MFP 20 to alternatively select and set the process to be performed on the target data item by using the data of the data source. In this example, "facsimile transmission", "facsimile transmission+(backup) transfer", and "folder transfer" can be selected as the contents of the designated process.

Furthermore, the item "valid/invalid" is for specifying whether to perform a process(es) indicated in the item "designated process" or whether to perform the process of recognizing data in the barcode (which is performed before performing the process of the "designated process").

It is to be noted that the item "barcode recognition result" is an item to which data obtained by analyzing the image data in the barcode location (barcode recognition) is temporarily registered. This item "barcode recognition result" may therefore be blank at the time of setting the item "data source location" or the item "designated process". Furthermore, the "barcode recognition result" does not necessarily have to be set in series with the above-described items.

In this example, the size of the image of the image data (target data item) is set in the item "image size". By setting the image size, a warning may be given when the values set as the parameters of the barcode location beyond the range (area) of the image.

In a case of performing analysis of the data source or performing the designated process on the image data of the target data item, it may be preferable to rotate the image before performing the processes depending on the direction (orientation) of the image. Therefore, the item "image direction" is provided. The angle or rotation direction of the image can be obtained from the settings of the item "image direction". Thus, in a case of rotating the image before analyzing the data source, the location of the area designated by the item "barcode location" may be set as the rotated location corresponding to the image direction, to thereby enable analysis of the data source based on the rotated location.

In a case where it is determined that the "image size" does not match the direction of the read image due to inadvertent setting of the document, the analysis of the data source may be performed after matching the orientations of the document and the image by rotating the image or the location of the area designated by the item "barcode location".

Figure 7:
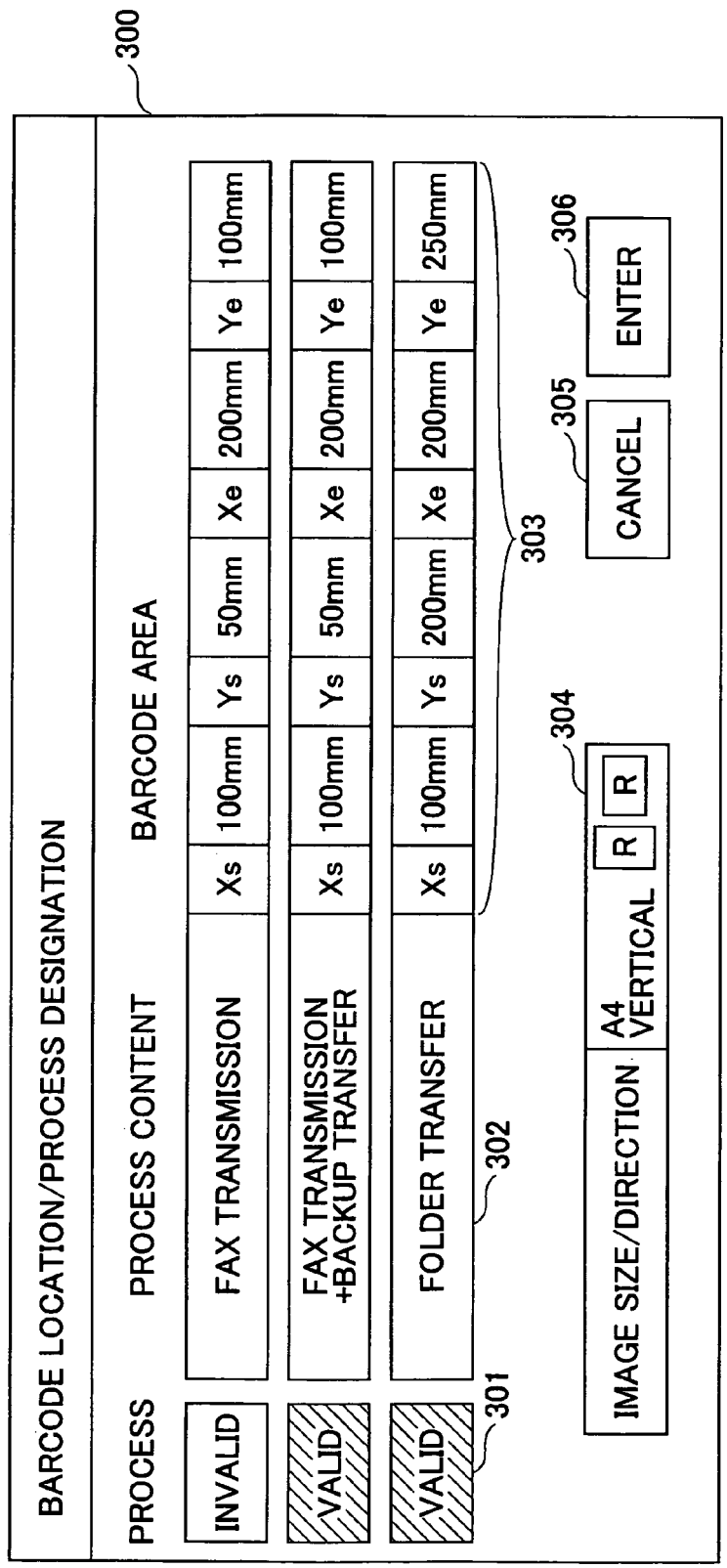
FIG. 7 shows a display example of a barcode location/process designation screen of the MFP shown in FIG. 4.

As shown in FIGS. 7-11, the process setting part 214 displays the above-described settings stored in the process storing part on the control panel 27 with various GUIs and acquires setting instructions, for example, from the user via the control panel. FIG. 7 shows a display example of a barcode location/process designation screen 300. The barcode location/process designation screen 300 is for displaying overall data regarding the settings of the designated process and the data source and also for acquiring designation of items that are to be set.

In this example, the barcode location/process designation screen 300 includes a valid/invalid display part 301, a process content display part 302, and a barcode location display part 303 which are provided in correspondence with each combination of the process content and the data source. The barcode location/process designation screen 300 also includes an image size/direction display part 304, a cancel button 305, and an enter button 306.

The valid/invalid display part 301 is for displaying the settings of the item "valid/invalid" shown in FIG. 6 and also for acquiring an instruction to switch between valid and invalid according to touch operations made on the control panel 27 by the user.

The process content display part 302 is for displaying the content of the settings of the item "designated process" and for acquiring an instruction to display the screen for setting the item "designated process" according to touch operations made on the control panel 27 by the user.

The barcode location display part 303 is for displaying the settings of the item "barcode location" and for acquiring an instruction to display the screen for setting the values of the coordinates corresponding to the "barcode location" according to touch operations made on the control panel 27 by the user.

The image size/direction display part 304 is for displaying the settings of the item "image size" and the item "image direction" and for acquiring an instruction to display the screen for setting these items.

The cancel button 305 is for acquiring an instruction to close the barcode location/process designation screen 300 and return to an initial screen without executing the changes of the settings. The enter button 306 is for acquiring an instruction to execute the changes of the settings and close the barcode location/process designation screen 300 and return to an initial screen.

Figure 8:
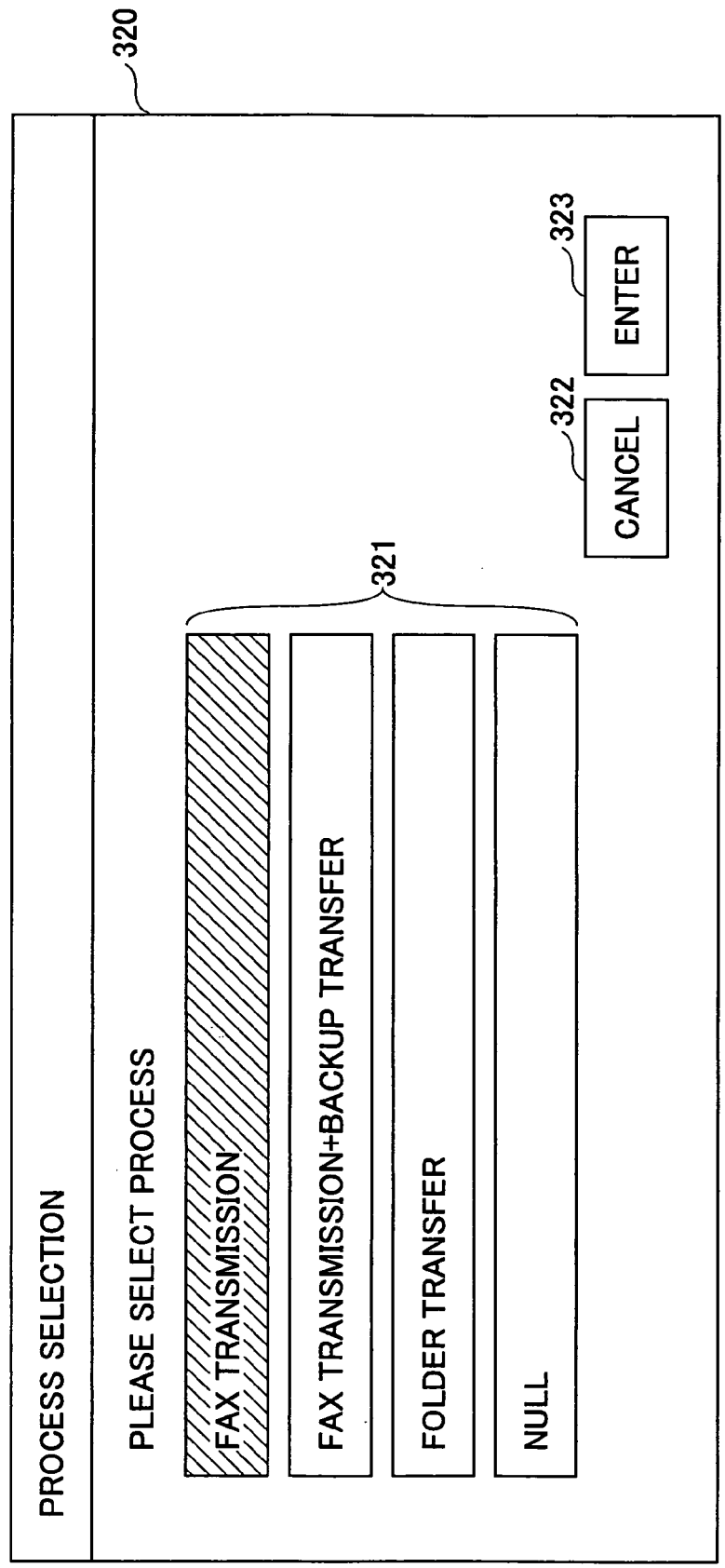
FIG. 8 shows a display example of a process selection screen of the MFP shown in FIG. 4.

FIG. 8 shows a display example of a process selection screen 320 which is displayed (opened) for setting the item "designated process" in a case where a touch operation is made on the process content display part 302.

The process selection screen 320 has process selection buttons 321 corresponding to the processes that can be set to the item "designated process". By pressing one of the process selection buttons 321, a process desired to be set can be alternatively selected. For example, the color, the density, or the pattern of the button corresponding to the selected process (in this example, the button "fax transmission") may be displayed differently so that the user can recognize that the button is selected.

By pressing the cancel button 322, the process selection screen 320 closes and returns to an initial screen without executing the changes of the settings on the barcode position/designation screen 300. By pressing the enter button 323, the process selection screen 320 returns to the initial barcode position/designation screen 300 after executing the changes of the settings on the barcode position/designation screen 300. In this example, the changes of the settings do not affect the content of the process storing part 215 unless the enter button 306 of the barcode position/designation screen 300 is pressed.

Figure 9:
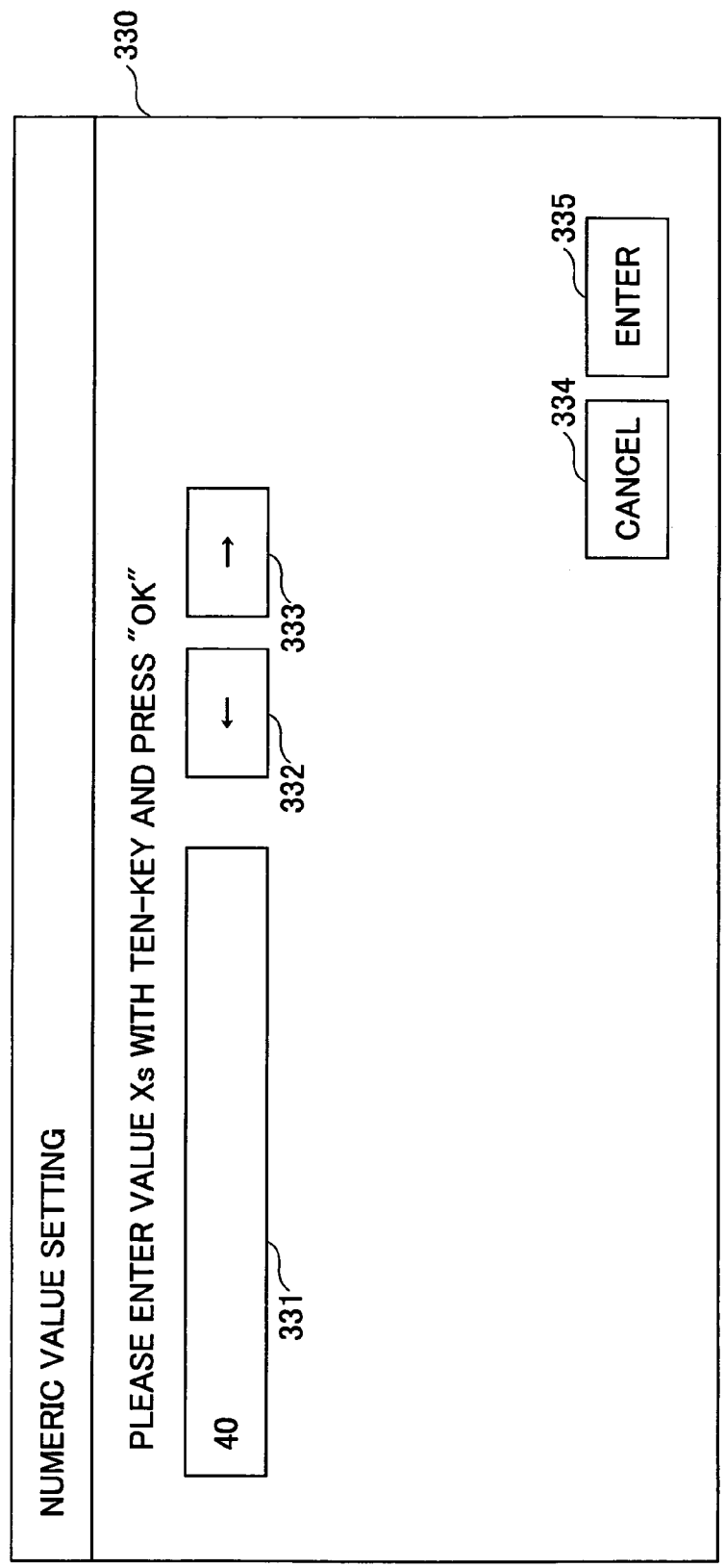
FIG. 9 shows a display example of a numeric value setting screen of the MFP shown in FIG. 4.

FIG. 9 shows a display example of a numeric value setting screen 330 which is displayed (opened) for setting the item "barcode location" in a case where a touch operation is made on the barcode location display part 303. More specifically, FIG. 9 shows a display example of the numeric value setting screen 330 in a case of setting the value of parameter "Xs" by touching (touch operation) on part of the screen corresponding to the parameter "Xs".

The numeric value setting screen 330 is provided with a numeric value input part 331. In this example, numeric values can be input from a ten-key or a numeric pad (not shown) provided on the control panel 27. Furthermore, a reduction button and an increase button are provided for instructing reduction or increase of the numeric value.

The functions of the cancel button 334 and the enter button 335 are the same as those of the process selection screen 320. However, even after the enter button 335 is pressed, an error screen (see FIG. 10) may pop up on the screen when the value input to the numeric value input part 331 indicates a location (coordinate) exceeding the area (range) of the image size set in the item "image size". Thereby, the user can be notified of the error and re-enter the numeric value. This prevents the user from setting a location that does not include the data source. Furthermore, a similar error screen (warning) may also appear when the magnitude relations between "Xs" and "Xe" or between "Ys" and "Ye" seem erroneous.

Figure 11:
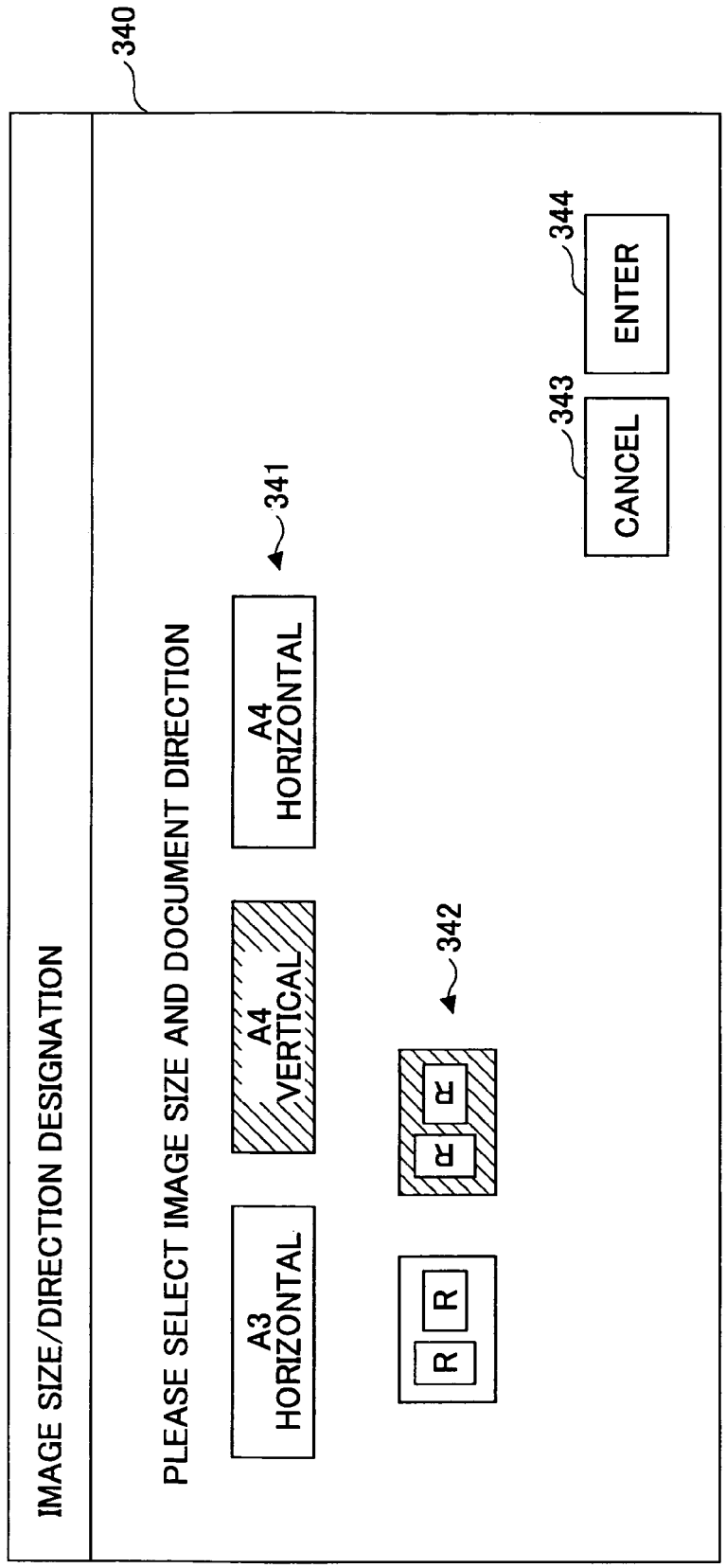
FIG. 11 shows a display example of a image size/direction setting screen of the MFP shown in FIG. 4.

FIG. 11 shows a display example of a image size/direction setting screen 340 which is displayed (opened) for setting the items "image size" and "image direction" in a case where a touch operation is made on the image size/direction display part 304.

The image size/direction setting screen 340 has size selection buttons 341 corresponding to the sizes that can be set to the item "image size" and direction selection buttons 342 corresponding to the directions that can be set to the item "image direction". By pressing one of the size selection buttons 341 and the one of the direction selection buttons 342, the image size and image direction desired to be set can be alternatively selected. In the example shown in FIG. 11, the direction selection button 342 on the left side indicates that "the direction of the reading line is vertical", and the direction selection button 342 on the right side indicates that "the direction of the reading line is horizontal".

Furthermore, the color, the density, or the pattern of the buttons may be displayed differently so that the user can recognize which button is selected as in the case of the process selection screen 320. Furthermore, the functions of the cancel button 43 and the enter button 344 are the same as those of the process selection screen 320.

Next, the processes and operations executed by the MFP 20 according to the process content and the data of the data resource are described.

Figure 12:
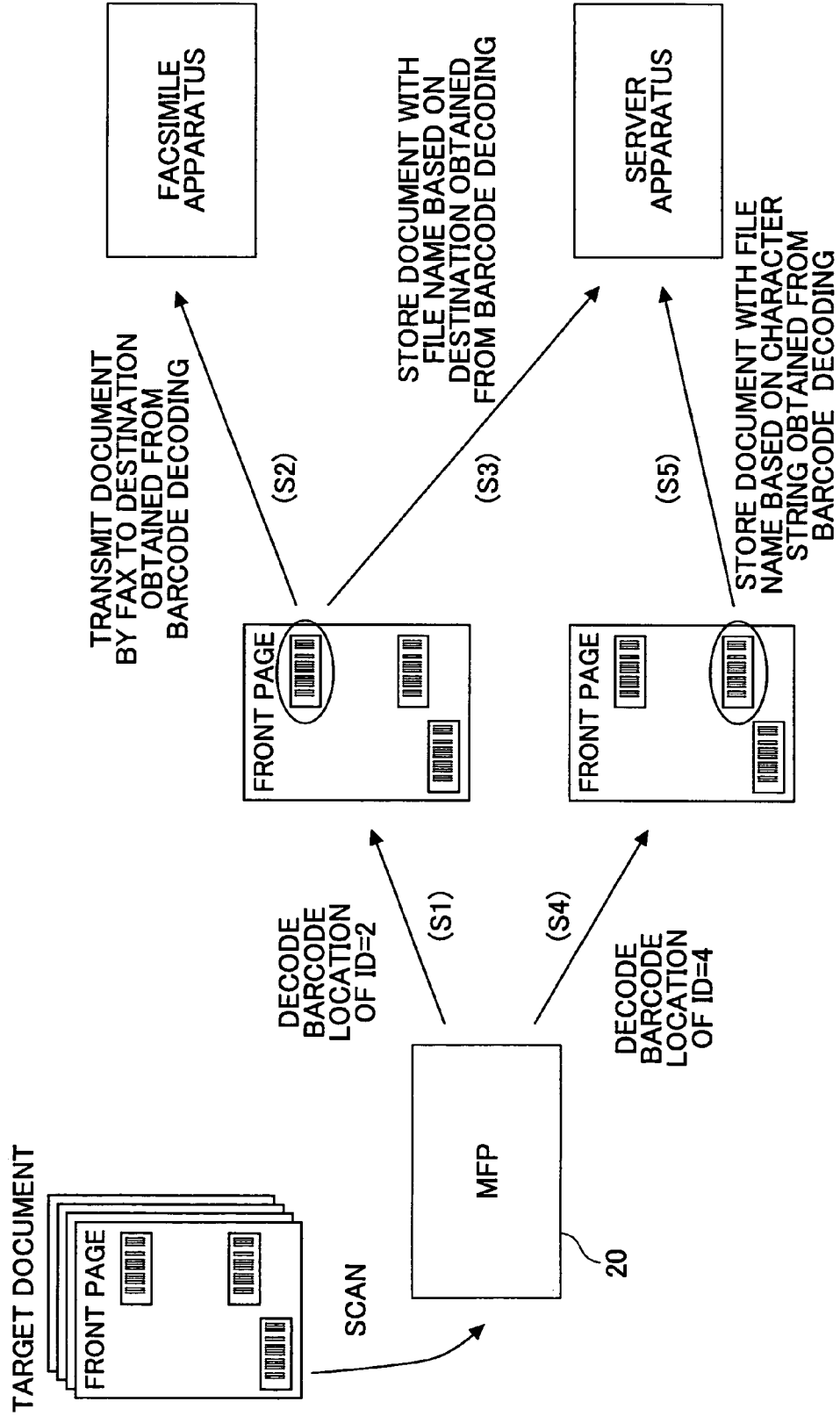
FIG. 12 is a schematic view showing the processes and operations of the MFP shown in FIG. 4 in a case where data shown in FIG. 6 are set in the process storing part.

First, an overview of the processes and operations of the MFP 20 is described with reference to FIG. 12. FIG. 12 is a schematic view showing the processes and operations of the MFP 20 in a case where data shown in FIG. 6 are set in the process storing part 215.

In a case of performing a process(es) with the MFP 20 using the data shown in FIG. 6, the mode of the process to be performed is selected. Then, image data of a target document is input to the MFP 20. The image data may be input by using methods such as reading the image data by scanning the target document with the scanner engine 28, receiving the image data by facsimile communication or network communication, or reading out the image data from a storing part (e.g. HDD). A barcode or an image of the barcode is to be formed beforehand (for example, by using a method such as printing, adhering a sticker, image processing) at a part of the document based on location data of the data source. Furthermore, the image data including the barcode may be read out and temporarily stored in the HDD 25. Thereby, the target data item can be read out from the HDD 25 and processed.

Then, the MFP 20, after acquiring the input image data as the target data item, obtains data to be used for processing the target data item from the location designated as the location of the data source. In a case where the page at which the data source is located is not designated, the MFP 20 may obtain the data from the first page of the image data. In this example, since no page is designated, the MFP 20 obtains the data from the first page of the image data.

In a case where data shown in FIG. 6 are set, the first designated process which is set "valid" (in this example, referred to as "ID=2") is to be executed first. Accordingly, the image data located in the barcode location of ID=2 is decoded, to thereby obtain data (in this example, destination data) included in the barcode formed in the barcode location (Step S1).

Then, a "facsimile transmission+transfer" process is executed. That is, a target document is transmitted by facsimile to the destination data obtained by the decoding operation (Step S2) and the image data of the target document is stored in the server apparatus with a file name based on the obtained destination data (Step S3).

The facsimile number may be directly indicated in the destination data. Alternatively, a given name may be indicated in the destination data for allowing the MFP 20 to search through a telephone book. It is however required for the MFP 20 to know what data is indicated in the obtained decoded data and how to obtain the facsimile number of the destination.

Meanwhile, the file name may be denoted with a consecutive arrangement of data including, for example, a destination telephone number and a transmission time (including year, month, day, hour, minute, and second of the transmission) and attached with an extension corresponding to the format of the data to be stored. The address of the server and the location inside the server (e.g. folder, directory) to which the data are stored may be determined beforehand.

A second designated process which is set "valid" (in this example, referred to as "ID=3") is to be executed after or in parallel with the execution of the above-described process ID=2. Accordingly, the image data located in the barcode location of ID=3 is decoded, to thereby obtain data (in this example, character string data) included in the barcode formed in the barcode location (Step S4).

Then, a "folder transfer" process is executed. That is, image data of the target document is stored in the server apparatus 42 with a file name based on the obtained character string data (Step S5). The file name may be generated with data attached thereto (e.g. numerals indicating transmission time including year, month, day, hour, minute, and second of transmission or extension of a predetermined file).

Once the execution of all of the "valid" processes is completed, the MFP 20 ends the processing of the target data item.

Next, an operation executed by the CPU 21 is described in further detail with reference to the flowcharts shown in FIGS. 13-16.

Figure 13:
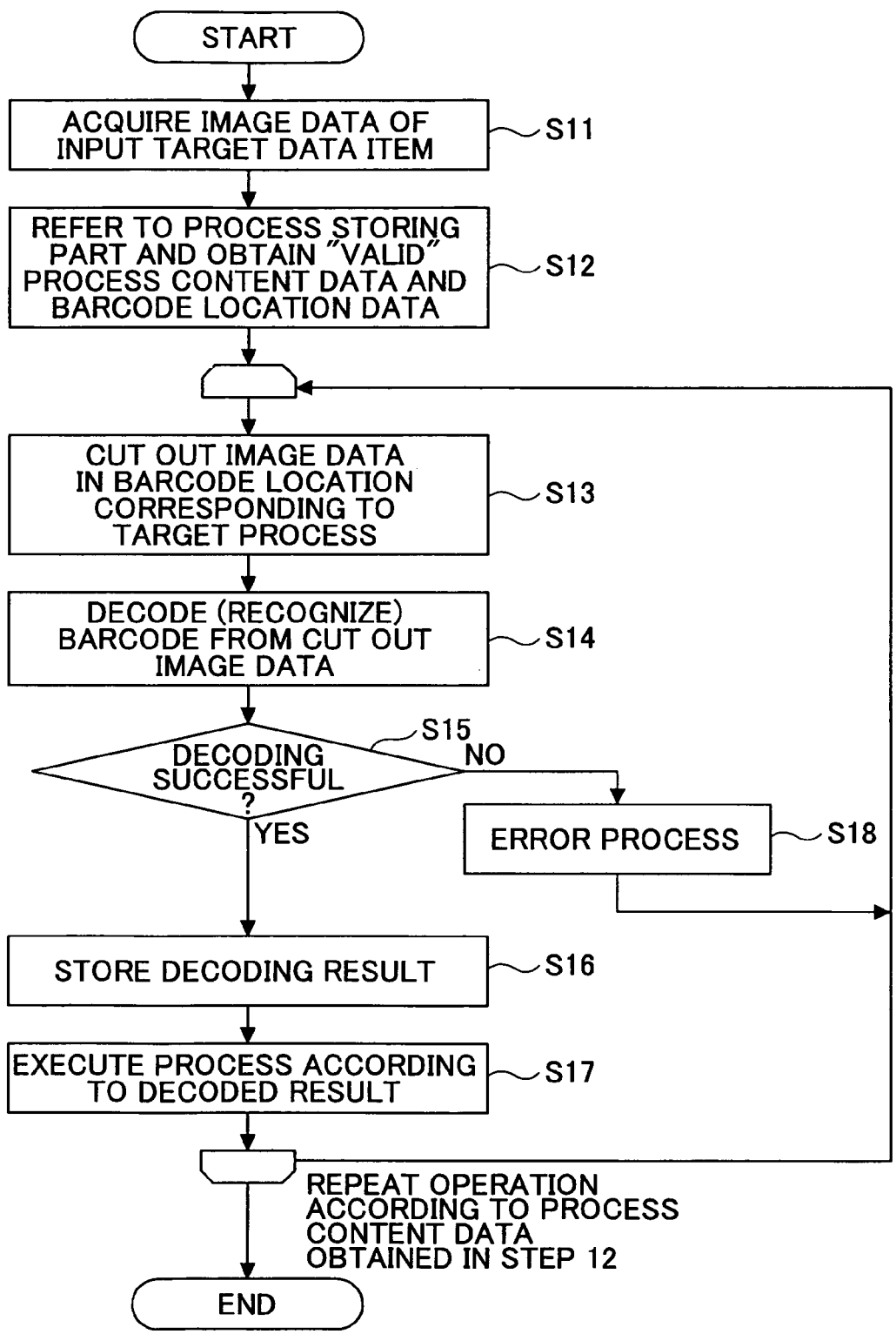
FIG. 13 is a flowchart showing an operation executed by a CPU of the MFP shown in FIG. 4 in a case where image data is input as target document data to the MFP.

FIG. 13 shows a flowchart of an operation executed by the CPU 21 in a case where the image data is input as target document data to the MFP 20 in a state where a process mode using the data shown in FIG. 6 is selected.

In this case, the CPU 21 starts the operation shown in the flowchart of FIG. 13 when detecting input of image data of a target data item. First, the CPU 21 acquires the input image data (Step S11). Then, the CPU 21 refers to the process storing part 215 and obtains data of a "valid" designated process (target process) and data of the barcode location corresponding to the valid designated process (Step S12).

Then, the CPU 21 repeats performing an operation including Steps S13-S18 (described below) in correspondence with each of the designated processes obtained in Step S12.

In this repetitive operation, the CPU 21 cuts out (extracts) an image data item located in a barcode location corresponding to the target process from the image data of the first page of the input image data (Step S13). Then, the CPU 21 performs barcode recognition (barcode decoding) on the cutout image data, to thereby obtain data (e.g. string of numerals and/or characters) indicated in the barcode (Step S14).

Then, the CPU 21 determines whether the decoding succeeded (Step S15). Then, the CPU 21 stores the decoding result (Step S16). Then, the CPU 21 executes the target process in accordance with the data of the decoding result (Step S17). The target process executed by the CPU 21 differs depending on the content of the process. The processes executed by the CPU 21 are described in further detail below.

In a case where there is other processes remaining after Step S17, the operation returns to Step S13, to thereby repeat the operation including Steps S13-S17.

In a case where the decoding fails in Step S15, the CPU 21 performs an error process including, for example, informing the user that the target process could not be executed properly (Step S18). In a case where there is other processes remaining, the operation returns to Step S13, to thereby repeat the operation including Steps S13-S17. Alternatively, it is possible to exit from the loop when it is determined that the decoding has failed.

After Steps S13-S18 are performed on all of the target processes obtained in Step S12, the CPU 21 ends the operation of the flowchart shown in FIG. 13.

In the operation shown in FIG. 13, the CPU 21 functions as a data processing part.

Next, an exemplary process executed in Step S17 is described with reference to FIGS. 14-16.

Figure 14:
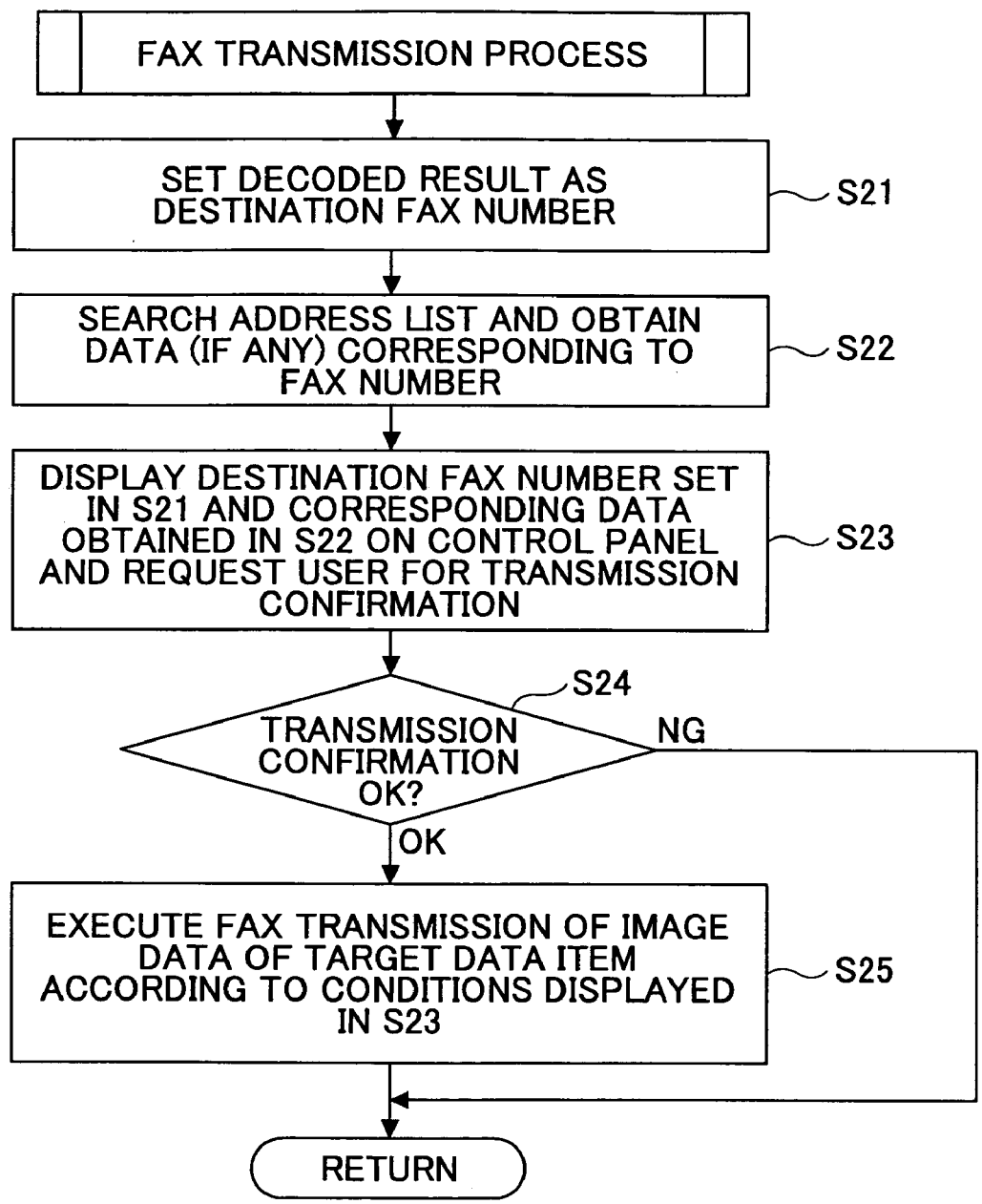
FIG. 14 is a flowchart showing a facsimile transmission process as an example of the process executed in Step S17 of FIG. 13.

FIG. 14 is a flowchart showing a facsimile transmission process according to an embodiment of the present invention.

In this process, the CPU 21 sets a decoded result as a facsimile destination number (Step S21). In a case where the facsimile destination number is inappropriate (for example, in a case where the decoded result includes a character(s) other than a numeral or a hyphen), an error process may be performed.

Then, the CPU 21 searches an address list and obtains data (if any) corresponding to the facsimile destination number set in Step S21 (Step S22). The obtained data may be, for example, name of destination, type of line, overseas transmission mode. Then, the CPU 21 displays the destination facsimile number set in Step S21 and the corresponding data obtained in Step S22 on the control panel 27 and requests the user to confirm the facsimile transmission (Step S23).

In a case where the user confirms the facsimile transmission (OK in Step S24), that is, in a case where there is an instruction to execute the facsimile transmission process with the conditions shown in Step S23, the CPU 21 performs the facsimile transmission process on the image data of the target data item with the conditions of Step S23 (Step S25). Then, the process returns to the initial state of Step S21. In a case where there is an instruction to cancel execution of the facsimile transmission process (i.e. NG in Step S24), the process returns to the initial state of Step S21 without executing the facsimile transmission process.

It is to be noted that a re-try operation or an error display operation of a common facsimile apparatus may be conducted in a case where the facsimile transmission fails in Step S25.

Accordingly, the image data of the target data item can be transmitted to the facsimile destination number indicated by the barcode located at the set barcode location.

Figure 15:
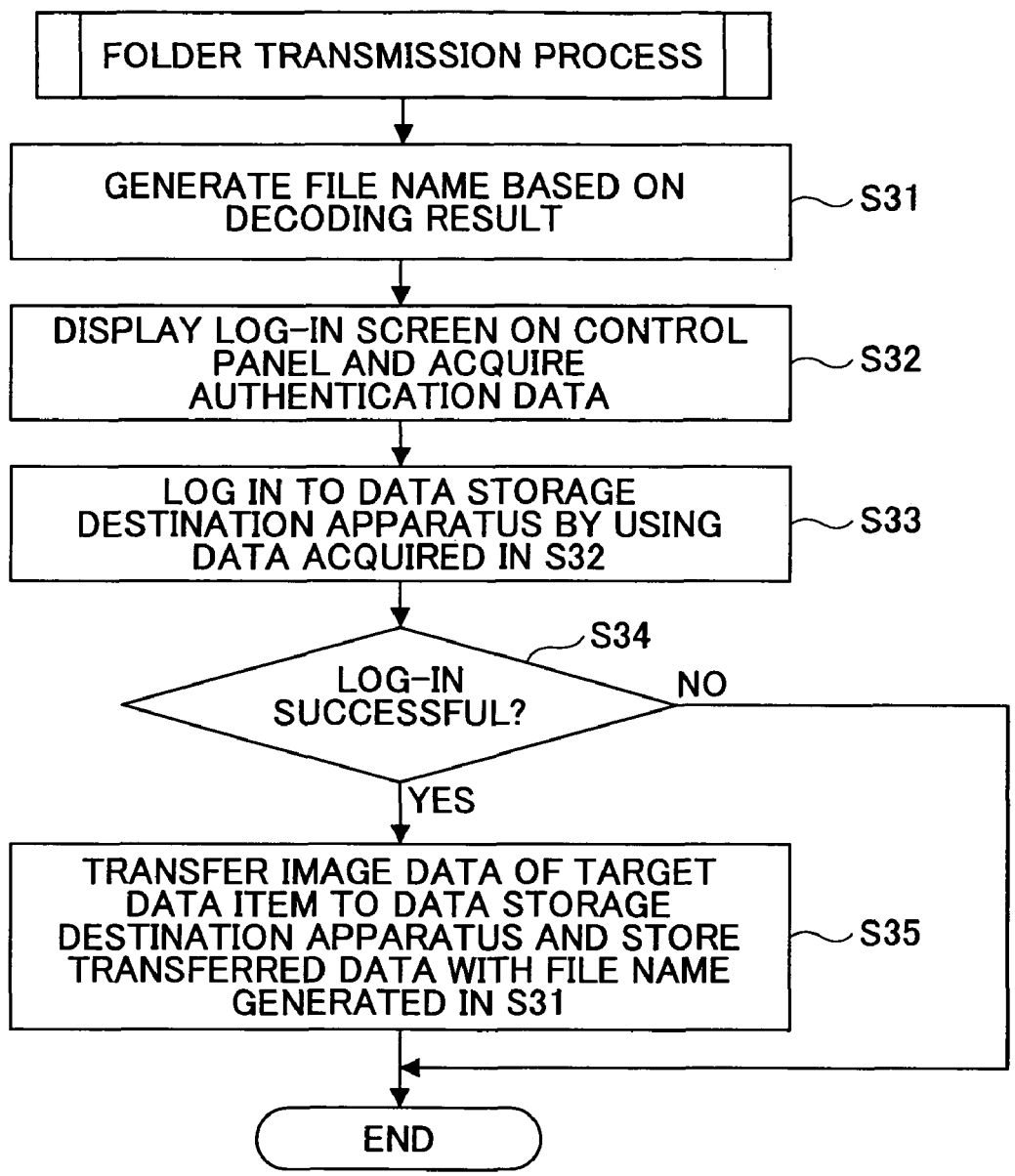
FIG. 15 is a flowchart showing a folder transfer process as another example of the process executed in Step S17 of FIG. 13.

FIG. 15 is a flowchart showing a folder transfer process according to an embodiment of the present invention.

In this process, the CPU 21 generates a file name based on a decoded result (Step S31). In this step, a predetermined preliminary process is performed on a character string obtained by decoding a barcode. For example, the predetermined preliminary process may be, attaching data such as numerals indicative of the transmission time including year, month, day, hour, minute, and second or attaching extension of a predetermined file. In this example, besides the file name, data for identifying the storage destination of a file (e.g. address or folder name of apparatus for storing data) may be obtained by decoding of a barcode, by searching through a table based on the decoded results, or by using a predetermined value that does not rely on the decoded results.

Then, the CPU 21 displays a log-in screen on the control panel 27 for logging-in to an apparatus of the storage destination and acquires input of authentication data to be used for the log-in (Step S32). However, in a case where predetermined authentication data is used for the log-in, the CPU 21 may not need to newly acquire authentication data.

Then, the CPU 21 logs in to the apparatus of the storage destination by using the authentication data (or by using the predetermined authentication data) acquired in Step S32 (Step S33). If the CPU 21 determines that the log-in is a success (Yes in Step S34), the CPU 21 transfers the image data of the target data item to the apparatus of the storage destination to allow the apparatus to store the transferred image data with the file name generated in Step S31 (Step S35). Then, the CPU 21 returns to the beginning of the process.

If the log-in fails (No in Step S34), the CPU 21 ends the process and returns to the beginning of the process. In this case, the CPU 21 may display failure of the log-in on the control panel 27 or acquire the authentication data again and re-try the log-in.

Accordingly, the image data of the target data item can be transmitted to a predetermined apparatus and stored in the apparatus with a file name indicated by the barcode located at the set barcode location. It is to be noted that the Steps S32-34 may be omitted in a case where the apparatus of the storage destination requires no authentication.

Figure 16:
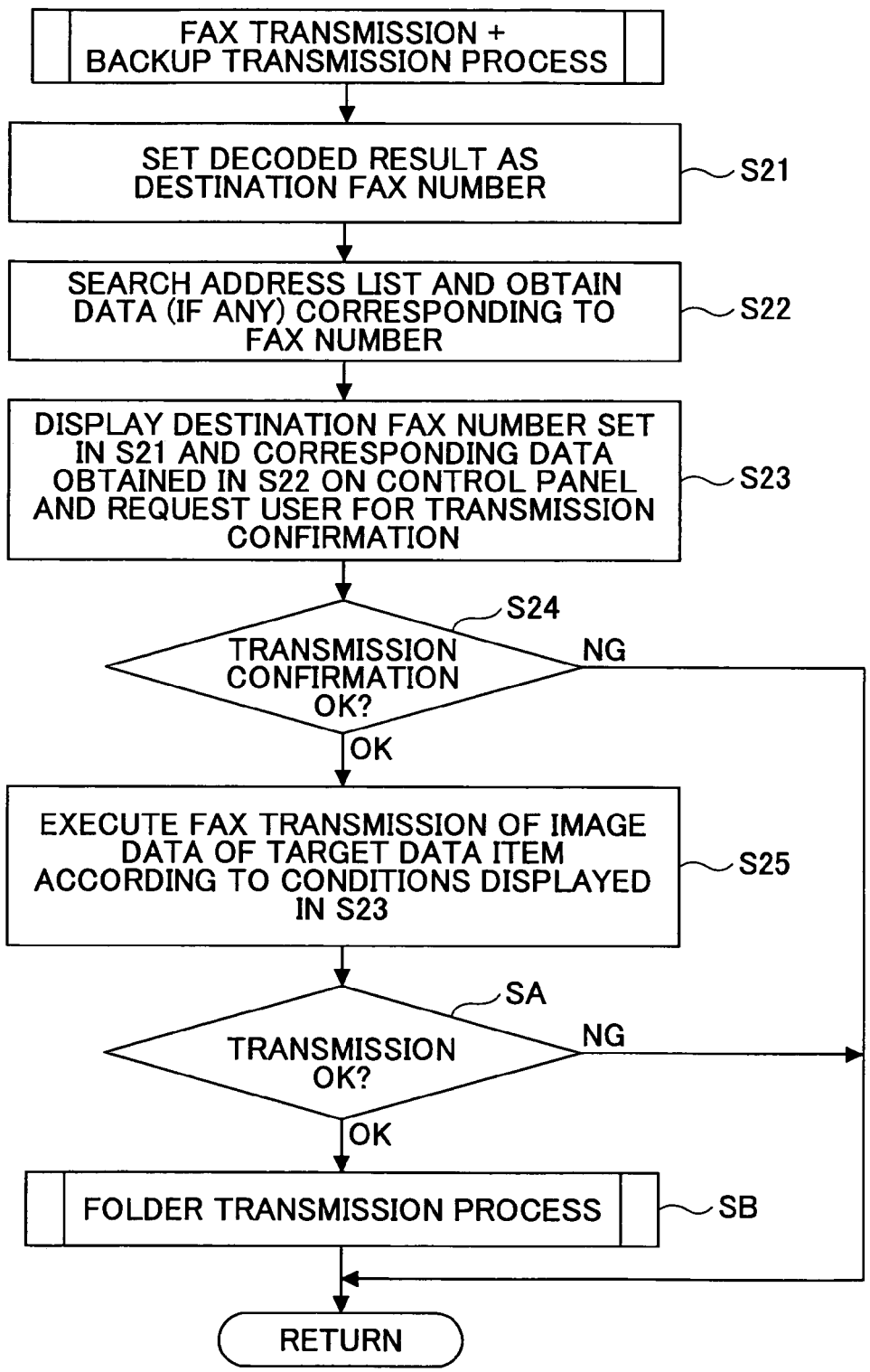
FIG. 16 is a flowchart showing a facsimile transmission+ backup transmission process as yet another example of the process executed in Step S17 of FIG. 13.

FIG. 16 is a flowchart showing a facsimile transmission+ backup transmission process according to an embodiment of the present invention.

This process is substantially the same as the facsimile transmission process shown in FIG. 14. However, in the facsimile transmission+backup transmission process, the CPU 21 determines whether the facsimile transmission of Step S25 is successful in Step SA. In a case where the facsimile transmission is successful (OK in Step SA), the CPU 21 executes a folder transmission process as shown in FIG. 15 (Step SB). Thereby, image data, which is the same as the image data transmitted by facsimile, is transmitted to a predetermined apparatus of a storage destination to allow the image data to be stored based on the facsimile destination number. In a case where the facsimile transmission fails (NG in Step SA), the CPU 21 ends the process and returns to the beginning of the process.

Accordingly, in addition to transmitting the image data of the target data item by facsimile, the image data can be stored in a predetermined apparatus to serve as backup of the transmitted image data.

By executing the processes shown in FIGS. 13-16, the MFP 20 can obtain data from an appropriate barcode in a target data item and execute each process designated to be performed on the target data item by using the data obtained from a corresponding barcode. Furthermore, even in a case where there are data of plural barcodes in a target data item, the MFP 20 can execute each process using appropriate data obtained from a corresponding barcode since the location to be decoded (barcode location) is set beforehand in correspondence with each process. In addition, even where a barcode having no relationship with any of the designated processes exists in the target data item, the presence of such barcode presents no problem to the MTP 20.

Furthermore, in a case of transmitting a target data item to an outside entity, the target data item can be prevented from being inadvertently transmitted to the wrong destination by using the process shown in FIG. 13 since each process is executed based on appropriate corresponding data. This prevents confidential information from leaking outside.

Furthermore, since the data used for executing the designated processes are described in the form of a code symbols (e.g. barcode), recognition (decoding) of the data can be executed more accurately. It is, however, to be noted that the data may be described in other forms. For example, the data may be described in the form of letters for allowing the data to be recognized by using OCR.

Furthermore, the target data item can easily be input and executed by the MFP 20 since the acquisition of the target data item may be conducted, for example, by reading the target data item with a scanner, by receiving the target data item via a public line or a network, or by reading out the target data item from a storing part.

It is to be noted that plural process of the same kind may be registered (set) in the process storing part 215. For example, by registering plural facsimile transmission processes where each facsimile transmission process uses data of a barcode located at different locations, an image (target data item) having plural barcodes formed thereon can be fax-transmitted to plural destinations by simply inputting the image once to the MFP 20.

MODIFIED EXAMPLE, FIGS. 17-18

As a modified example of the data processing apparatus (MFP) of the second embodiment of the present invention, the data processing apparatus may perform an operation of automatically inputting barcode location data to be stored in the process storing part 215.

Figure 17:
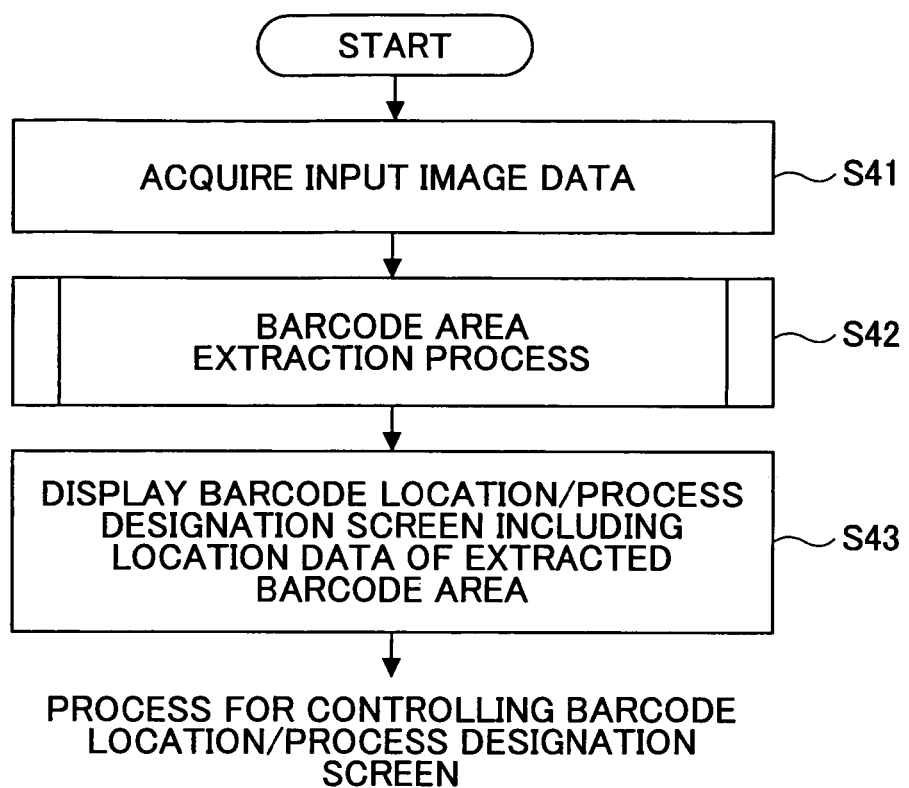
FIG. 17 is a flowchart showing an operation executed by a CPU of the MFP shown in FIG. 4 in a case where barcode location data is automatically input to the MFP.
Figure 18:
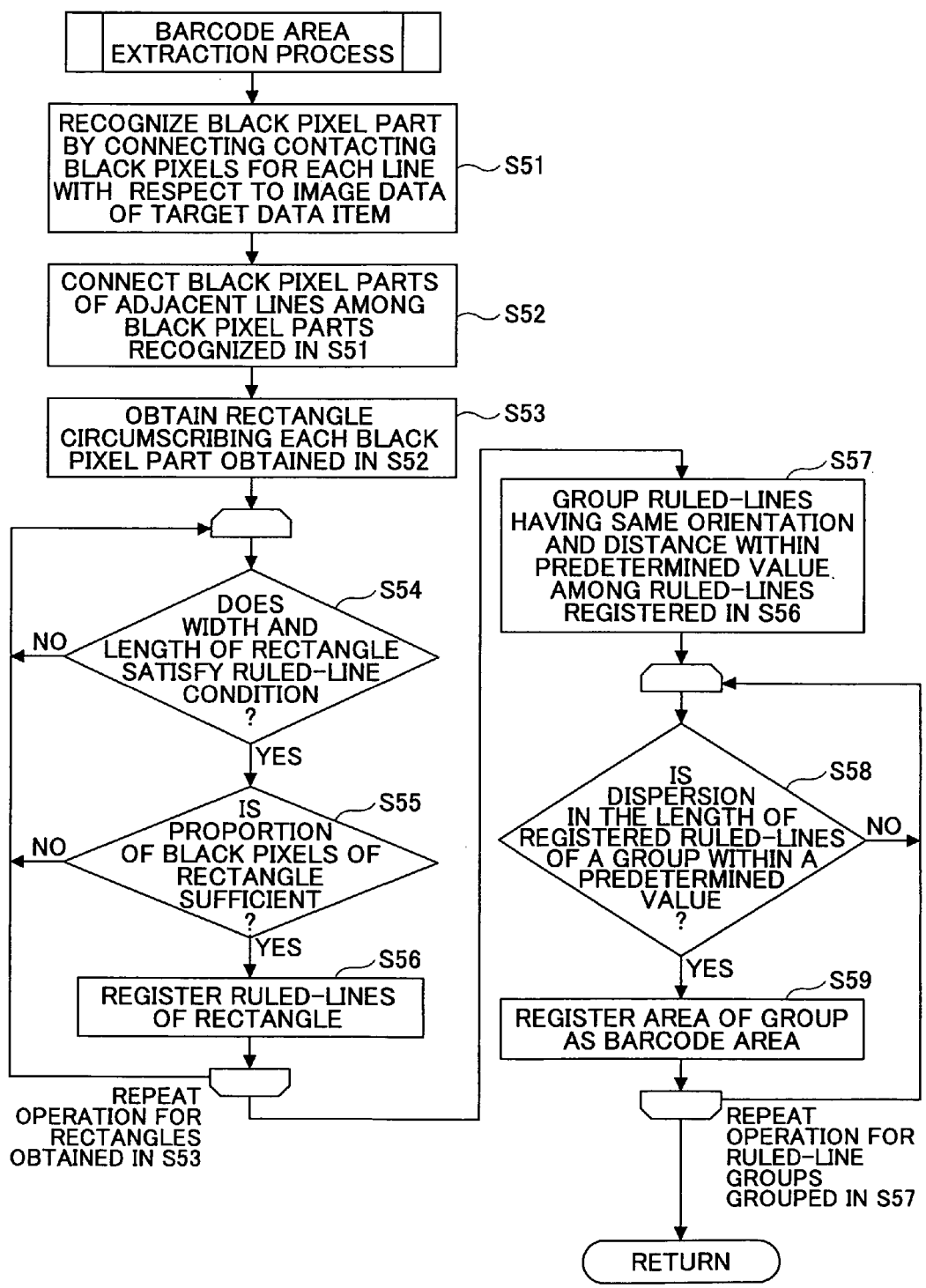
FIG. 18 is a flowchart showing the barcode area extracting process executed in Step S42 of FIG. 17.

FIGS. 17 and 18 are drawings for explaining the operation.

For example, in a case where image data are input in a state where an automatic input mode is selected, the CPU 21 may perform the operation shown in FIG. 17.

In this operation, the CPU 21 acquires input image data (Step S41). Then, the CPU 21 performs a barcode area extraction process shown in FIG. 18 on the image data (Step S42). Then, the CPU 21 displays the barcode location/process designation screen 300 which is input with location data of the extracted barcode area (Step S43), to thereby allow various controls to be performed on the barcode location/process designation screen 300.

In this state where the barcode location/process designation screen 300 is displayed, the image size may also be set according to the size of the input image data acquired in Step S41. Furthermore, in this state displaying the barcode location/process designation screen 300, designated processes (process content) and validity of designated process (valid/invalid) may be set in correspondence with each extracted barcode area. Furthermore, in this state displaying the barcode location/process designation screen 300, the location data (e.g. parameter values) of the extracted barcode areas may be changed.

In the barcode area extraction process shown in FIG. 18, the CPU 21 connects contacting black pixels for each line in the input image data and recognizes black pixel parts formed by the connecting of the black pixels (Step S51). Then, among the recognized black pixel parts, the CPU 21 connects contacting black pixel parts situated in adjacent lines (Step S52). Then, the CPU 21 obtains a rectangle circumscribing each black pixel part connected in Step S52 (Step S53).

Then, the CPU 21 repeats performing the Steps S54-S56 on each obtained rectangle (target rectangle).

In Step S54, the CPU 21 determines whether the width and length of a target rectangle satisfy a predetermined condition having a value suitable for a ruled-line (ruled-line condition). In Step S55, the CPU 21 determines whether the proportion of the black pixels in the target rectangle is no less than a predetermined value suitable for a bar of a barcode (bar condition). In a case where the conditions of Steps S54 and S55 are satisfied, the CPU 21 registers the target rectangle as a ruled-line. In a case where the conditions of Steps S54 and S55 are not satisfied, the CPU 21 returns to Step S54 for performing Steps S54-S56 on other remaining rectangles that have not been subject to Steps S54-56.

Then, after Steps S54-S56 are performed on all of the obtained rectangles, the CPU 21 categorizes the registered ruled-lines into groups (Step S57). Among the registered ruled-lines, ruled-lines having the same orientation (direction) and a distance (interval) no greater than a predetermined value suitable for a bar of a barcode are categorized as a group.

Then, the CPU 21 repeats performing the Steps S58-S59 on each group of ruled-lines (target group).

In Step S58, the CPU 21 determines whether dispersion in the lengths of the ruled-lines in a target group is no greater than a predetermined value suitable for a bar of a barcode. In a case where the dispersion is no greater than the predetermined value (Yes in Step S58), the CPU 21 determines that the target group is a single barcode (Step S59) and registers the area of the target group as a barcode area.

Then, after Steps S57-S59 are performed on all of the registered ruled-lines, the CPU 21 ends the barcode area extraction process and returns to the beginning of the process.

With the above-described operation of automatically inputting location data of the barcode, the user does not need to measure and input the location at which the barcode is to be formed. This increases the operability of the data processing apparatuses 10, 20. It is to be noted that location data of code symbols other than a barcode may also be automatically input. This can be achieved by performing the extraction process that matches to the code pattern of the code symbol.

In a case where the data processing apparatus (such as the data processing apparatus 10 in the first embodiment of the present invention) can use code symbols of different types (e.g. barcode, QR code), the data process apparatus may perform the area extraction process in correspondence with the type of code symbol. Accordingly, data corresponding to the type of code symbol can be automatically set depending on the process that extracted area of the code symbol.

The data set with the format shown in FIGS. 3 and 6 may be stored in correspondence with the size of each image of the acquired image data. Accordingly, in a case where the MFP 20 acquires image data from a target document by scanning the document with the scanner engine 28, a format corresponding to the size of the image of the image data can be automatically obtained from the data storing part and used for performing a desired process on the image data. Furthermore, execution of a given program installed or created by the user may be set as one of the processes in the item "designated process", to thereby allow the data processing to execute the program of the user.

Furthermore, the processes which can be selected by the user may be stored (e.g. in a property file) in correspondence with each user. Accordingly, the processes which can be selected by the user are displayed once the user is authenticated by the data processing apparatus 10, 20. In a case where there is only one process in the item "designated process", the process may automatically set in the storing part and performed on the target data item. Thus, by adding the operation of automatically recognizing the area of the code symbol (data source), the items shown in FIGS. 3 and 6 may be set simply by reading a document including a code symbol without using a user interface (e.g. control panel).

Furthermore, the items shown in FIGS. 3 and 6 may be set in correspondence with each user, so that items corresponding to the user may selected and used once the user is authenticated by the data processing apparatus 10, 20.

Furthermore, the item "valid/invalid" indicated in the format (table) of FIG. 3 or 6, so that all of the designated processes may be performed on the target data item.

The present invention is not limited to a case of applying the MFP 20 to an image processing apparatus. For example, the present invention may be used in a system for reading data from a form having various data (e.g. address, name, telephone number, fax number, item number, quantity) described in corresponding areas of the form and storing the data in a database. In this system, an order form can be automatically printed out based on the read data and transmitted to a facsimile destination according to facsimile number written in the fax number area.

Furthermore, the data processing apparatus of the present invention may be applied to data processing apparatuses other than the above-described image processing apparatus.

The program of the present invention may be a program for causing a computer to perform the functions of the above-described data processing apparatus 10, 20. The program may be initially stored in a storing part (e.g. ROM, HDD) of a computer or recorded to a computer-readable recording medium (e.g. CD-ROM, flexible disk, SRAM, EEPROM, memory card, and other non-volatile recording media (memory)). The recorded program may be installed into the computer and executed by the CPU of the computer. The program may be read out from the memory and executed by the CPU of the computer. Furthermore, the data processing apparatus 10, 20 may be connected to a network for downloading the program from an outside computer having the program stored in its memory part or a recording medium.

Hence, with the data processing apparatus, method of controlling the data processing apparatus according to the above-described embodiment of the present invention, in a case where a process is desired to be performed on a target data item by using data included in a data source in the target data item, the desired process can be reliably performed based on the corresponding data source in the target data item.

Further, the present invention is not limited to these embodiments, but various variations and modifications may be made without departing from the scope of the present invention.

The present application is based on Japanese Priority Application No. 2006-022111 filed on Jan. 31, 2006, with the Japanese Patent Office, the entire contents of which are hereby incorporated by reference.

What is claimed is:

1. A data processing apparatus comprising:
an acquiring part for acquiring a target data item on which a data source is located;
a setting part for setting location data in correspondence with a designated process, the location data indicating the location of the data source with respect to the target data item;
a storing part for storing the location data and the designated process in a table that includes a plurality of data source location data, a corresponding data source type for each of the plurality of data source location data, and at least one corresponding designated process for each of the plurality of data source location data; and
a data processing part for locating the data source located on the target data item by referring to the location data stored in the storing part, obtaining data included in the data source, and performing the designated process corresponding to the location data of the data source on the target data item in accordance with the data obtained from the data source.

2. The data processing apparatus as claimed in claim 1, wherein the setting part is configured to set a plurality of location data, wherein the data processing part is configured to obtain data from a plurality of the data sources located at a plurality of the locations in the target data item by referring to the table and performing the designated process corresponding to the location data on the target data item by using the data obtained from the plural data sources.

3. The data processing apparatus as claimed in claim 1, wherein the designated process includes transmitting the target data item outside.

4. The data processing apparatus as claimed in claim 1, wherein the data source includes a code symbol.

5. The data processing apparatus as claimed in claim 1, wherein the acquiring of the target data item includes reading the target data item from a document, receiving the target data item from a network, and reading out the target data item from a storing part.

6. A data processing method comprising the steps of:
a) acquiring a target data item on which a data source is located;
b) setting location data in correspondence with a designated process, the location data indicating the location of the data source with respect to the target data item;
c) storing the location data and the designated process in a table that includes a plurality of data source location data, a corresponding data source type for each of the plurality of data source location data, and at least one corresponding designated process for each of the plurality of data source location data;
d) locating the data source located on the target data item by referring to the location data stored in step c);
e) obtaining data from the data source; and
f) performing the designated process corresponding to the location data of the data source on the target data item by using the data obtained from the data source.

7. The data processing method as claimed in claim 6, wherein a plurality of location data are set in step a), wherein a plurality of the data sources located at a plurality of the locations in the target data item are obtained by referring to the table, wherein the designated process corresponding to the location data on the target data item is performed by using the data obtained from the plural data sources in step d).

8. The data processing method as claimed in claim 6, wherein the designated process includes transmitting the target data item outside.

9. The data processing method as claimed in claim 6, wherein the data source includes a code symbol.

10. The data processing method as claimed in claim 6, wherein the acquiring of the target data item includes reading the target data item from a document, receiving the target data item from a network, and reading out the target data item from a storing part.

11. A computer-readable recording medium on which a program for causing a computer to execute a data processing method is recorded, the data processing method comprising the steps of:
a) acquiring a target data item on which a data source is located;
b) setting location data in correspondence with a designated process, the location data indicating the location of the data source with respect to the target data item;
c) storing the location data and the designated process in a table that includes a plurality of data source location data, a corresponding data source type for each of the plurality of data source location data, and at least one corresponding designated process for each of the plurality of data source location data;
d) locating the data source located on the target data item by referring to the location data stored in step c);
e) obtaining data from the located data source; and
f) performing the designated process corresponding to the location data of the data source on the target data item by using the data obtained from the data source.

12. The computer-readable recording medium as claimed in claim 11, wherein a plurality of location data are set in step a), wherein a plurality of the data sources located at a plurality of the locations in the target data item are obtained by referring to the table in step c), wherein the designated process corresponding to the location data on the target data item is performed by using the data obtained from the plural data sources in step d).

13. The computer-readable recording medium as claimed in claim 11, wherein the designated process includes transmitting the target data item outside.

14. The computer-readable recording medium as claimed in claim 11, wherein the data source includes a code symbol.

15. The computer-readable recording medium as claimed in claim 11, wherein the acquiring of the target data item includes reading the target data item from a document, receiving the target data item from a network, and reading out the target data item from a storing part.

16. The data processing apparatus as claimed in claim 1, wherein the data source is a barcode and the location data indicates the location of the barcode with respect to the target data item.

17. The data processing method as claimed in claim 6, wherein the data source is a barcode and the location data indicates the location of the barcode with respect to the target data item.

18. The computer-readable recording medium as claimed in claim 11, wherein the data source is a barcode and the location data indicates the location of the barcode with respect to the target data item.

* * * * *